(12) United States Patent
Maggenti et al.

(10) Patent No.: US 8,077,634 B2
(45) Date of Patent: *Dec. 13, 2011

(54) SYSTEM AND METHOD FOR PROVIDING GROUP COMMUNICATION SERVICES

(75) Inventors: Mark Maggenti, San Diego, CA (US); Douglas M. Crockett, San Diego, CA (US); Eric Rosen, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2623 days.

This patent is subject to a terminal disclaimer.

(21) Appl. No.: 10/243,904

(22) Filed: Sep. 12, 2002

(65) Prior Publication Data

US 2003/0012149 A1    Jan. 16, 2003

Related U.S. Application Data

(63) Continuation of application No. 09/518,985, filed on Mar. 3, 2000, now Pat. No. 6,477,150.

(51) Int. Cl.
*H04L 12/16* (2006.01)

(52) U.S. Cl. ...................................... 370/260

(58) Field of Classification Search .......... 370/260–261, 370/310–312, 229, 462, 472, 381, 438, 907, 370/418, 387, 468, 252, 401, 390, 270, 328, 370/380, 346, 352, 353, 427, 230, 235, 395, 370/432, 338, 414, 413, 389, 398, 335, 327, 370/399, 354, 467, 356, 331, 400, 265, 447, 370/392, 236, 351, 396, 477, 296; 379/177, 379/221, 202, 201, 49; 455/518, 450, 436, 455/466, 416, 503, 343, 517, 127, 445, 427, 455/12, 428, 519, 434, 456, 411, 414, 458, 455/417, 426, 463, 435, 41, 47, 512, 403, 455/555, 461, 554, 446, 90; 709/223, 204, 709/225, 224, 202, 203, 229, 250, 226, 227, 709/238; 375/256, 316; 398/58, 48; 340/10.33, 340/539, 7.39, 7.21, 7.32; 711/151, 158; 710/240–244, 111, 113, 116, 119; 705/7
See application file for complete search history.

(56) References Cited

U.S. PATENT DOCUMENTS 4,281,380 A * 7/1981 DeMesa et al. ............... 710/119
(Continued)

FOREIGN PATENT DOCUMENTS

EP         0566957         10/1993
(Continued)

OTHER PUBLICATIONS

TIA/EIA/IS-707-A "Data Service Options for Spread Spectrum Systems: Async Data and Fax Services" and "Data Service Options for Spread Spectrum Systems: Packet Data Services" Apr. 1999.
(Continued)

*Primary Examiner* — Robert Scheibel
*Assistant Examiner* — Prenell P Jones
(74) *Attorney, Agent, or Firm* — Raphael Freiwirth

(57) ABSTRACT

A system and method for providing group communication services. Each of a plurality of communication devices coverts information signals into data packets suitable for transmission over a data network, such as the Internet. The data packets are transmitted through the data network to a communications manager. The communications manager acts as a configurable switch, allowing communications from any communication device to be routed to the plurality of communication devices. The communications manager further allows users of other communication systems and devices to participate in group communications with each other.

25 Claims, 12 Drawing Sheets

INTEGRATED NBS ARCHITECTURE

U.S. PATENT DOCUMENTS

| | | | |
|---|---|---|---|
| 4,550,402 A * | 10/1985 | Gable et al. | 370/438 |
| 4,955,083 A * | 9/1990 | Phillips et al. | 455/47 |
| 4,977,589 A * | 12/1990 | Johnson et al. | 455/403 |
| 5,164,985 A | 11/1992 | Nysen et al. | 380/9 |
| 5,387,905 A | 2/1995 | Grube et al. | |
| 5,436,893 A * | 7/1995 | Barnett | 370/392 |
| 5,450,405 A | 9/1995 | Maher et al. | |
| 5,479,477 A | 12/1995 | McVey et al. | |
| 5,491,835 A | 2/1996 | Sasuta et al. | |
| 5,511,232 A | 4/1996 | Odea et al. | |
| 5,524,273 A | 6/1996 | Coley et al. | |
| 5,530,914 A | 6/1996 | McPheters | |
| 5,530,915 A | 6/1996 | Shaughnessy et al. | |
| 5,530,916 A | 6/1996 | Schultz | |
| 5,530,918 A | 6/1996 | Jasinski | |
| 5,533,015 A * | 7/1996 | Makowski et al. | 370/296 |
| 5,535,426 A | 7/1996 | Leigh et al. | |
| 5,537,684 A * | 7/1996 | Cassidy et al. | 455/512 |
| 5,542,108 A | 7/1996 | Sasuta | |
| 5,555,447 A | 9/1996 | Kotzin et al. | |
| 5,564,071 A | 10/1996 | Liou et al. | |
| 5,574,934 A | 11/1996 | Mirashrafi et al. | |
| 5,590,127 A | 12/1996 | Bales et al. | |
| 5,612,959 A * | 3/1997 | Takase et al. | 370/390 |
| 5,717,830 A * | 2/1998 | Sigler et al. | 455/426.1 |
| 5,850,611 A | 12/1998 | Krebs | |
| 5,859,979 A | 1/1999 | Tung et al. | |
| 5,901,142 A | 5/1999 | Averbuch et al. | |
| 5,912,882 A * | 6/1999 | Yafuso et al. | 370/270 |
| 5,914,958 A | 6/1999 | Chinitz et al. | |
| 5,923,853 A | 7/1999 | Danneels | |
| 5,946,399 A | 8/1999 | Kitaj et al. | |
| 6,005,848 A | 12/1999 | Grube et al. | |
| 6,011,782 A | 1/2000 | DeSimone et al. | |
| 6,037,991 A | 3/2000 | Thro et al. | |
| 6,081,601 A | 6/2000 | Raivisto | 380/270 |
| 6,084,919 A | 7/2000 | Kleider et al. | |
| 6,118,771 A * | 9/2000 | Tajika et al. | 370/328 |
| 6,119,163 A | 9/2000 | Monteiro et al. | |
| H1894 H | 10/2000 | Flectcher et al. | 455/403 |
| 6,160,544 A | 12/2000 | Hayashi et al. | 345/327 |
| 6,215,790 B1 * | 4/2001 | Voit et al. | 370/401 |
| 6,275,499 B1 * | 8/2001 | Wynn et al. | 370/438 |
| 6,279,029 B1 | 8/2001 | Sampat et al. | |
| 6,301,255 B1 * | 10/2001 | Park | 370/399 |
| 6,321,095 B1 | 11/2001 | Gavette | |
| 6,331,986 B1 * | 12/2001 | Mitra et al. | 370/468 |
| 6,332,153 B1 | 12/2001 | Cohen | |
| 6,385,461 B1 * | 5/2002 | Raith | 455/518 |
| 6,396,843 B1 * | 5/2002 | Chiussi et al. | 370/418 |
| 6,404,761 B1 | 6/2002 | Snelling et al. | |
| 6,411,815 B1 * | 6/2002 | Balasuriya | 455/512 |
| 6,466,964 B1 * | 10/2002 | Leung et al. | 709/202 |
| 6,477,150 B1 * | 11/2002 | Maggenti et al. | 370/312 |
| 6,496,693 B1 | 12/2002 | Tran | |
| 6,532,237 B1 * | 3/2003 | Or et al. | 370/396 |
| 6,556,542 B1 * | 4/2003 | Sudo et al. | 370/236.1 |
| 6,574,232 B1 * | 6/2003 | Honig et al. | 370/413 |
| 6,594,498 B1 | 7/2003 | McKenna et al. | |
| 6,621,514 B1 | 9/2003 | Hamilton | |
| 6,674,734 B1 * | 1/2004 | Hsu et al. | 370/331 |
| 6,711,147 B1 * | 3/2004 | Barnes et al. | 370/338 |
| 6,711,398 B1 * | 3/2004 | Talaie et al. | 455/403 |
| 6,782,475 B1 | 8/2004 | Sumner | |
| 6,795,444 B1 * | 9/2004 | Vo et al. | 370/401 |
| 6,850,497 B1 * | 2/2005 | Sigler et al. | 370/310 |
| 6,904,041 B1 * | 6/2005 | Korpi et al. | 370/401 |
| 6,930,994 B1 | 8/2005 | Stubbs | |
| 6,981,034 B2 * | 12/2005 | Ding et al. | 709/223 |
| 7,170,863 B1 * | 1/2007 | Denman et al. | 370/260 |
| 7,237,004 B2 | 6/2007 | Slobodin et al. | |
| 2002/0104098 A1 | 8/2002 | Zustak et al. | |
| 2002/0181395 A1 * | 12/2002 | Foster et al. | 370/229 |
| 2003/0078066 A1 | 4/2003 | Maggenti et al. | |
| 2004/0004942 A1 | 1/2004 | Nebiker et al. | |
| 2004/0019668 A1 | 1/2004 | Kakadia | |
| 2004/0064351 A1 * | 4/2004 | Mikurak | 705/7 |

FOREIGN PATENT DOCUMENTS

| | | |
|---|---|---|
| EP | 0744857 A2 | 11/1996 |
| JP | 7212733 A | 8/1995 |
| JP | 09321790 | 12/1997 |
| JP | 2000050225 A | 2/2000 |
| JP | 2000513526 T | 10/2000 |
| JP | 200136528 | 2/2001 |
| JP | 2002517965 A | 6/2002 |
| JP | 2003523024 T | 7/2003 |
| WO | 9501024 | 1/1995 |
| WO | 9728658 | 8/1997 |
| WO | 9747149 | 12/1997 |
| WO | WO97050267 | 12/1997 |
| WO | 9963773 | 12/1999 |
| WO | WO0120939 A1 | 3/2001 |
| WO | WO0159706 A1 | 8/2001 |

OTHER PUBLICATIONS

Handley et al. : RFC2327 "SDP: Session Description Protocol" Apr. 1998, pp. 1-42.

Handley et al. : RFC 2543, "SIP: Session Initiation Protocol" Mar. 1999, pp. 1-153.

International Search Report—PCT/US2001/006799, International Search Authority—European Patent Office—Jun. 11, 2001.

International Preliminary Examination Report—PCT/US2001/006799, International Search Authority—IPEA/US—Washington, D.C.—Nov. 14, 2001.

U.S. Appl. No. 09/518,622 entitled "Method and apparatus for enabling group communication services in an existing communication system" filed Mar. 3, 2000.

U.S. Appl. No. 09/518,776 entitled "Method and Apparatus for Participating in Group Communication Services in an Existing Communication System" filed Mar. 3, 2000.

Networking Group : RFAC 2002, "IP Mobility Support", Oct. 1996, pp. 1-79.

TR45; Data Service Options for Spread Spectrum Systems: Async Data and Fax Services; Mar. 1999.

* cited by examiner

MEDIA SIGNALING MESSAGE SEQUENCE (PRIORITY ARBITRATION)

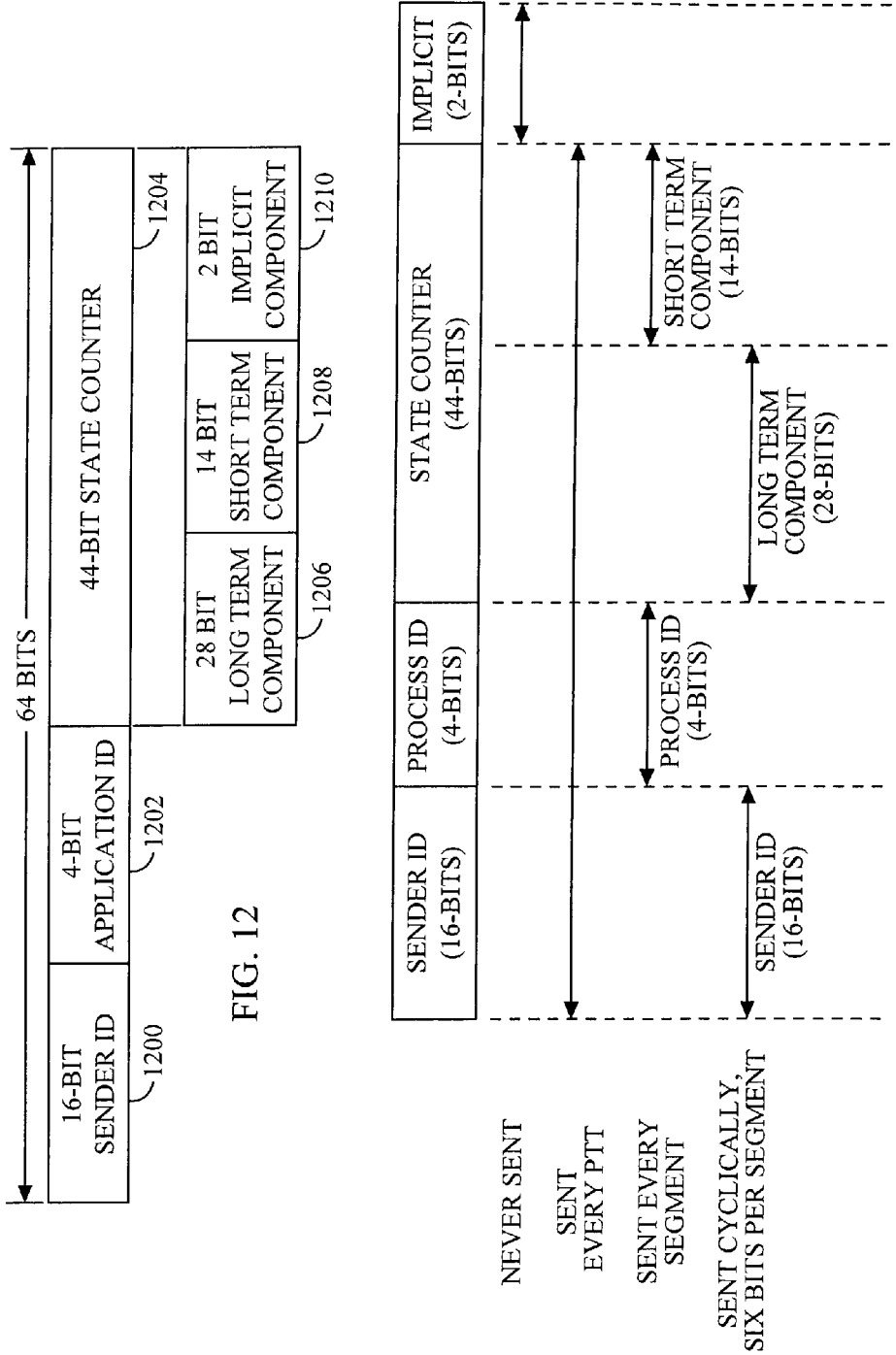

SYSTEM AND METHOD FOR PROVIDING GROUP COMMUNICATION SERVICES

CROSS-REFERENCE TO RELATED APPLICATION

This application is a continuation of U.S. patent application Ser. No. 09/518,985, filed Mar. 3, 2000, now U.S. Pat. No. 6,477,150, which application is incorporated herein by reference in its entirety.

BACKGROUND OF THE INVENTION

I. Field of the Invention

The system and method for providing group communication services relates generally to point-to-multipoint communication systems and more particularly to a method and apparatus for providing group communication services.

II. Description of the Related Art

Point-to-multipoint communication systems have been used for many years to provide communications generally between a central location and multiple users of the system. For example, dispatch systems using Land Mobile Radios (LMRs) have been used in trucks, taxis, buses, and other vehicles in order to communicate scheduling information between a central dispatch center and one or more corresponding fleet vehicles. Communications may be directed at a specific vehicle in the fleet or to all vehicles simultaneously.

Another example of a point-to-multipoint communication system is a wireless push-to-talk system. Such a system allows a group of individuals, each having a wireless telephone, to communicate with other members of the group. Typically, a push-to-talk system relies on a single frequency, or dedicated channel, over which communications are received by the wireless telephones. In most systems, only one member may transmit information to the other members at a time. However, all members can listen to the dedicated broadcast channel to receive communications from the single member who is transmitting. Members desiring to transmit to other members of the system typically send an access request by depressing a push-to-talk button on a respective communication device which allows sole access to the dedicated transmission channel.

Push-to-talk systems are typically used in outdoor settings where a group of geographically diverse people, or simply members, require communications with each other in a "point-to-multipoint" fashion. Examples of push-to-talk system uses include workgroup communications, security communications, construction site communication, and localized military communications. The group of people requiring communications with each other is commonly known as a "net," each member of the net sometimes referred to as a "net member."

In a typical push-to-talk system, a dedicated channel, sometimes referred to as a broadcast channel, is used to transmit communications from one member to multiple other members of the net simultaneously. Generally, only one member may transmit voice information to the other member users at any given time. If another member attempts to transmit over the broadcast channel while another member is transmitting, interference between the two competing communications will occur, resulting in non-intelligible communications being received by the other net members.

In order to implement a push-to-talk communication system in a conventional wireless communication system, expensive modifications to the infrastructure are necessary. Presently, there exists today at least one wireless push-to-talk communication system that allows point-to-multipoint communications to take place by undertaking such modifications. An example of such a system has been engineered by Motorola Incorporated of Schaumburg, Ill. and marketed as the Nextel Direct Connect® service, offered by Nextel Communications of Reston, Va.

Besides the cost problem associated with current wireless point-to-multipoint communication systems is that, generally, communications are confined to members operating in relative close proximity to each other using the same communication technology. In other words, the point-to-multipoint communications do not extend from a CDMA communication system, for example, to other communication networks or technologies, such as a GSM communication system, a Public Switched Telephone Network (PSTN), a data network, such as the Internet, or to a satellite communication systems, such as the GlobalStar™ satellite communication system.

These obstacles to providing group communication services are overcome by various embodiments of the system and method for providing group communication services as described herein.

SUMMARY OF THE INVENTION

In one embodiment, the system and method for providing group communication services is implemented within an existing CDMA wireless communication system.

Point-to-multipoint communications are enabled in one embodiment of the system and method for providing group communication services by converting real-time audio, video, and data (collectively referred to herein as media), into data packets in a communication device (CD). The data packets may be produced in accordance with data protocols, for instance, the well-known TCP/IP Internet protocol. The media is transmitted using an air interface, or by other means, depending on what type of communication device is used, to a data network, typically the Internet.

A communications manager (CM) enables data packets from the data network to be distributed to various net members of each defined net. Thus, the addition of the CM to a standard communication system quickly enables group communications. The CM is a device which acts as a configurable switch, connecting communications from one user to one or more other users defined as a net. The CM is a data device, meaning that it sends and receives data packets, as defined by the particular data network to which it is connected. In one embodiment, the CM is connected directly to the Internet, allowing data packets to be routed between the CM and, ultimately, the CDs.

The CM allows users other than those in the wireless communication system to participate in group communications. For example, an audio-capable desktop computer located in an office or home could participate in group communications with one or more users of a terrestrial wireless communication system. Alternatively, or in addition, users of a satellite communication system can participate in group calls with members of the terrestrial wireless system, desktop users, or both. Information between these various communication devices, i.e. wireless phones, wireline phones, satellite telephones, paging devices, portable or desktop computers, digital cameras, video cameras, etc., is transmitted among net members over the data network, coordinated by the CM.

One advantage of the system and method for providing group communication services over conventional wireless group communication systems is the ability to quickly and inexpensively implement group communication services in a wireless communication services. For example, an IS-95 compliant CDMA wireless communication system can support group communications simply by the addition of the CM and point-to-multipoint compatible communication devices. Another advantage of the system and method for providing group communication services is the ability for group communications to extend beyond the traditional boundaries of traditional wireless group communication systems. Using the system and method for providing group communication services, users of a CDMA wireless communication system can engage in group communications with users of different communication devices and technologies.

BRIEF DESCRIPTION OF THE DRAWINGS

The features, objects, and advantages of the system and method for providing group communication services will become more apparent from the detailed description set forth below when taken in conjunction with the drawings in which like reference characters identify correspondingly throughout and wherein:

FIG. 12 is an illustration of a state vector used in one embodiment of the system and method for providing group communication services;

FIG. 13 is an illustration of a cryptosync portion of an initial RTP payload as used in conjunction with the state vector of FIG. 13.

DETAILED DESCRIPTION OF THE PREFERRED EMBODIMENTS

The system and method for providing group communication services uses a communication device (CD) capable of generating data packets suitable for transmission over a data network such as the Internet. The data packets are transmitted to a data network, and are then provided to a communications manager (CM) connected to the data network. The CM processes data packets from a first CD and distributes the data packets in real-time to at least one other CD who is a member of the same predefined net as the first CD. The CM acts as a configurable switch able to route communications from any net member to other net members defined by the net.

Although the teachings of the system and method for providing group communication services are described with respect to a wireless CDMA communication system, it should be understood that the system and method for providing group communication services can be used with any wireless communication system including GSM systems, AMPS systems, TDMA systems, and satellite communication systems, as well as other communications systems. In addition, the system and method for providing group communication services is not limited to wireless communication systems. It can be used with wireline telephones, paging devices, portable or desktop computers, digital cameras, video cameras, etc. Furthermore, it should be understood that the system and method for providing group communication services is applicable to both real-time data, such as audio and video data (including voice data), and time-independent data, such as computer files, email, and so on.

Figure 1:
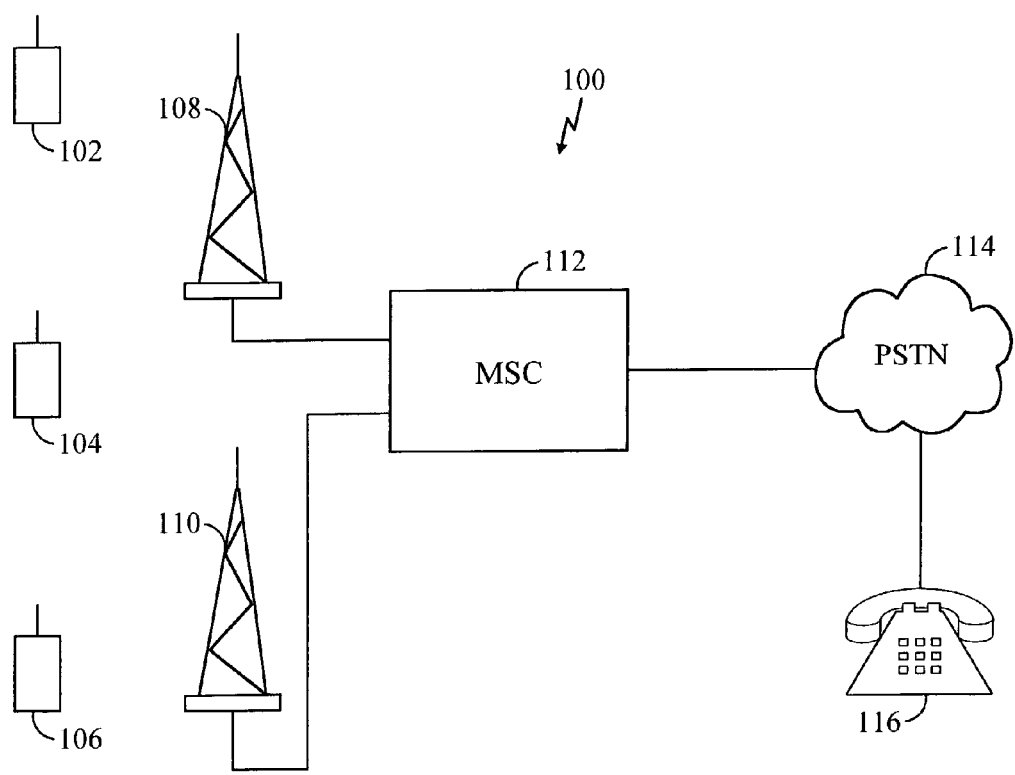
FIG. 1 is an illustration of a typical prior art wireless communication system incapable of implementing group communications.

FIG. 1 is an illustration of a typical prior art wireless communication system 100 incapable of implementing group communications, otherwise known as point-to-multipoint communications, or push-to-talk communications. CDs 102, 104, 106 represent three of a vast number of wireless telephones dispersed over a small geographic area served by communication system 100. CDs 102, 104, 106 transmit and receive communication signals from base stations 108, 110, generally depending on their proximity to each base station. In a typical wireless communication system, there are many base stations in use to support the vast numbers of CDs active in communication system 100.

Base stations 108 and 110 are connected to Mobile Switching Center (MSC) 112. MSC 112 provides various functionality to the wireless communication system, such as providing system control to base stations 108 and 110. In addition, MSC 112 provides switching and interface circuitry between base stations 108 and 110, and the Public Switched Telephone Network (PSTN) 114.

Group communications are generally not possible using the communication system of FIG. 1. However, conference calls between multiple users in the wireless communication system can be achieved if special circuitry is employed within MSC 112 to allow such conference calls to be made. For example, wireline telephone 116 may be able to communicate with CDs 102 and 104 simultaneously in a conference call. A conference call differs from group communications in that conference calls are generally not arbitrated, i.e., conference call users may speak simultaneously, and be heard by all other conference call users. The result in this situation is generally garbled speech to each user, due to the multiple conversations being simultaneously broadcast to each user. A well-known device for accomplishing a conference call of this type is a conference bridge.

GENERAL OVERVIEW

Figure 2:
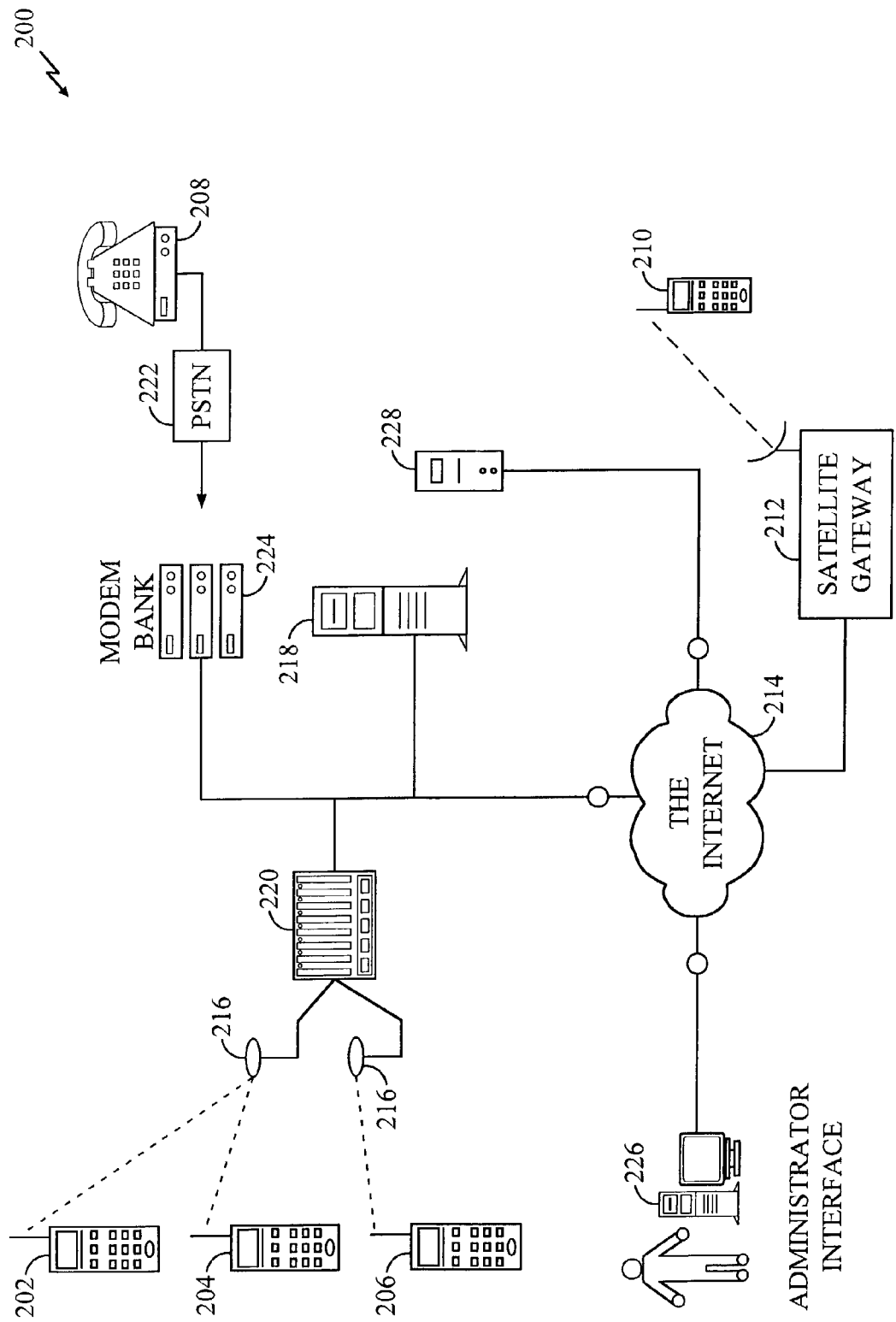
FIG. 2 illustrates a group communication system of one embodiment of the system and method for providing group communication services in functional block diagram format.

One embodiment of the system and method for providing group communication services is illustrated in functional block diagram format in FIG. 2. Shown is group communication system 200, otherwise known as a push-to-talk system, a net broadcast system, a dispatch system, or a point-to-multipoint communication system. A defining characteristic of such a communication system is that, generally, only one user may transmit information to other users at any given time. In group communication system 200, a group of communication device users, individually known as net members, communicate with one another using a communication device assigned to each net member.

The term "net" denotes a group of communication device users authorized to communicate with each other. Generally, a central database contains information identifying the members of each particular net. More than one net may operate in the same communication system. For instance, a first net may be defined having ten members and a second net may be defined having twenty members. The ten members of the first net can communicate with each other, but generally not to members of the second net. In other situations, members of different nets are able to monitor communications between members of more than one net, but are only able to transmit information to members within their own net.

Net members communicate with each other using an assigned communication device, shown as communication devices (CD) 202, 204, 206, 208, and 210. In the present example, CDs 202, 204, and 206 are terrestrial wireless telephones, CD 208 is a wireline telephone equipped with push-to-talk capability, and CD 210 is a satellite telephone also equipped with push-to-talk functionality. In other embodiments, the various CDs may comprise wireless video cameras, still cameras, audio devices such as music recorders or players, laptop or desktop computers, or paging devices. In another embodiment, at least one CD comprises a combination of the just-described embodiments. For example, CD 202 could comprise a wireless terrestrial telephone equipped with a video camera and display. Furthermore, each CD may be able to send and receive information in either a secure mode, or a non-secure (clear) mode. Throughout the following discussion, reference to an individual CD may be expressed as CD 202. However, it should be understood that reference to CD 202 is not intended to limit the discussion to a terrestrial wireless telephone. In general, discussions pertaining to CD 202 will apply equally to other types of CDs as well.

In the group communication system of FIG. 2, an exclusive transmission privilege is defined which generally allows only a single user to transmit information to other net members at any given time. The transmission privilege is granted or denied to requesting net members, depending on whether or not the transmission privilege is currently assigned to another net member when the request is received. The process of granting and denying transmission requests is known as arbitration. Other arbitration schemes evaluate factors such as priority levels assigned to each CD in determining whether a requesting net member is granted the transmission privilege.

In order to participate in group communications CDs 202, 204, 206, 208 and 210 are each equipped with a means for requesting the transmission privilege from a communications manager (CM) 218, as explained in greater detail below. CM 218 manages the real-time and administrative operation of nets, including PTT request arbitration, maintenance, and distribution of net membership and registration lists, call set-up and tear-down of necessary system and network resources, as well as overall control of net status.

CM 218 maintains a list of defined nets, defined as either clear or secure, and transitions between clear and secure are generally not permitted. A secure net relies on encryption provided by CDs to provide authentication and guard against eavesdropping. Encryption for secure nets is implemented on an end-to-end basis, meaning that encryption and decryption takes place within each CD. CM 218 generally operates with no knowledge of security algorithms, keys, or policies.

CM 218 is designed to be managed remotely by either a communication system service provider, net members, or both, assuming that authorization is provided by the service provider. CM 218 may receive net definitions through an external administration interface 226. Net members may request administrative actions through their service provider or administrate net functions through defined systems, such as a member-operated security manager (SM) 228 that conforms to a CM 218 administration interface. CM 218 can authenticate to high-grade commercial standards any party attempting to establish or modify a net.

SM 228 is an optional component of the system 200 which performs key management (i.e., distribution of encryption keys to net members), user authentication, and related tasks to support secure nets. A single group communication system may interact with one or more SMs. SM 228 is generally not involved in the real-time control of a net, including net activation or PTT arbitration. SM 228 may have administration capabilities compatible with a CM 218 interface to automate administration functions. SM 218 may also be capable of acting as a data endpoint for the purpose of participating in a net, to broadcast net keys, or simply monitor net traffic.

In one embodiment, the means for requesting the transmission privilege comprises a push-to-talk (PTT) key or switch. When a user in communication system 200 desires to transmit information to other net members, the push-to-talk switch located on his or her CD is depressed, sending a request to obtain the transmission privilege from communication manager 218. If no other net member is currently assigned the transmission privilege, the requesting user is granted the transmission privilege and is notified by an audible, visual, or tactile alert through the CD. After the requesting user has been granted the transmission privilege, information may then transmitted from that user to the other net members.

In one embodiment of the system and method for providing group communication services, each wireless net member establishes a forward link and a reverse link with one or more base stations 216 or satellite gateway 212, as the case may be. The former is used to describe a communication channel from a base station 216 or satellite gateway 214 to a CD, the latter used to describe a communication channel from a CD to a base station 216 or gateway 212. Voice and/or data is converted into data packets using a CD, the data packets being suitable for the particular data network 214 through which communications to other users take place. In one embodiment, data network 214 is the Internet. In another embodiment, a dedicated forward channel is established in each communication system (i.e. a terrestrial communication system and a satellite communication system) for broadcasting information from each net member to the other net members. Each net member receives communications from other net members over the dedicated channel. In yet another embodiment, a dedicated reverse link is established in each communication system for transmitting information to CM 218. Finally, a combination of the above schemes may be used, for instance, establishing a dedicated forward broadcast channel but requiring wireless CDs to transmit information to CM 218 over an individual reverse link assigned to each CD.

When a first net member wishes to transmit information to other members of the net, the first net member requests the transmission privilege by pressing a push-to-talk key on his or her CD, which generates a request formatted for transmission over data network 214. In the case of CDs 202, 204, and 206, the request is transmitted over-the-air to one or more base stations 216. MSC 220 comprises a well-known Inter Working Function (IWF) (not shown) for processing data packets, including the request, between MSC 220 and data network 214. For CD 210, the request is transmitted via satellite to satellite gateway 212. For CD 208, the request is transmitted to the Public Switched Telephone Network (PSTN) 222, then to modem bank 224. Modem bank 224 receives the request and provides it to data network 214.

If no other member currently holds the transmission privilege when the transmission privilege request is received by CM 218, CM 218 transmits a message to the requesting net member, notifying it that the transmission privilege has been granted. Audio, visual, or other information from the first net member may then be transmitted to the other net members by sending the information to CM 218, using one of the just-described transmission paths. In one embodiment, CM 218 then provides the information to the net members by duplicating the information and sending each duplicate to the net members. If a single broadcast channel is used, the information need only be duplicated once for each broadcast channel in use.

In an alternative embodiment, CM 218 is incorporated into MSC 220 so that data packets from supporting base stations are routed directly to CM 218 without being routed onto data network 214. In this embodiment, CM 218 is still connected to data network 214 so that other communication systems and devices can participate in a group communication.

In one embodiment, CM 218 maintains one or more databases for managing information pertaining to individual net members as well as to each defined net. For example, for each net member, one database may comprise a user name, an account number, a telephone number, or a dial number, associated with the member's CD, a Mobile Identification Number assigned to the CD, the current member's status in the net, such as whether the member is actively participating in the net, a priority code for determining how the transmission privilege is assigned, a data telephone number associated with the CD, an IP address associated with the CD, and an indication of which nets the member is authorized to communicate. Other related types of information may also be stored by the database with respect to each net member.

DETAILED DESCRIPTION

Interfaces to the system are grouped into functional and physical interfaces. The physical interfaces are not unique to group communication system 200 and consist of an existing wireless air interface, wireless service options, and commercial data networking standards. Higher layer functional interfaces, especially at the application layer, are unique to the group communication service.

Figure 3:
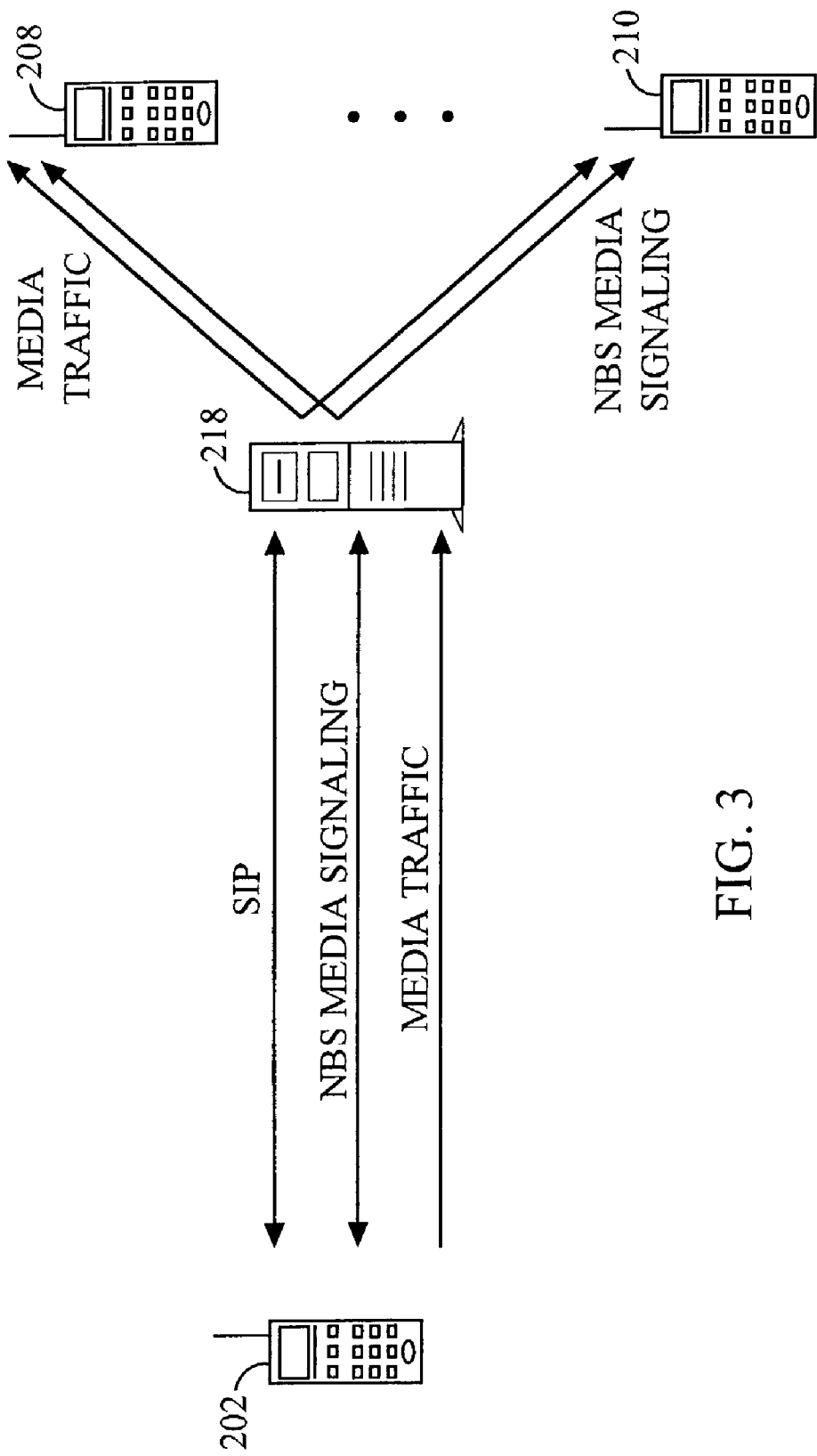
FIG. 3 illustrates the operating protocols used in the group communication system of FIG. 2.

At the application level, the system and method for providing group communication services operates over three Internet-based protocols in one embodiment, as shown in FIG. 3. Of course, other protocols, or a different number of protocols, could be used in the alternative. Communications between CM 218, and CDs 202, 208, and 210 occur within these protocols. CDs find, join, leave, and learn about various nets using a first protocol, known as the Session Initiation Protocol (SIP), which is a well-known signaling protocol used in the telecommunications industry. The second protocol, shown in FIG. 3 as NBS Media Signaling, is used to manage real-time net arbitration and dormancy, as explained later herein. Audio, including voice, video, or data (collectively referred to herein as media), is distributed separately via a third protocol, shown in FIG. 3 as media traffic. In the example of FIG. 3, CD 202 currently "has the floor", i.e., the transmission privilege, or permission to transmit media to the net. A "floor-control" request is a request for the transmission privilege. While CD 202 holds the transmission privilege, the remaining net members, shown on the right, are designated as listeners and correspondingly do not have permission to transmit media to the net. Generally, any CD can send media-signaling or SIP signaling traffic at any time, regardless of whether it holds the transmission privilege.

In one embodiment, CM 218 includes modem bank 224 which interfaces to PSTN 222. In another embodiment, modem bank 224 is located separately from CM 218. CDs interfacing to CM 218 through this interface establish an IP connection to CM 218 using the well-known Point-to-Point protocol (PPP), or optionally, any other equivalent link-layer protocol, running over one of several available standard dial-up modem protocols.

In one embodiment, CDs 202, 204, and 206 each provide a data packet connection to CM 218 in accordance with IS-707.5 IP packet data service option. IS-707.5 is a well-known interim standard describing packet data services in a CDMA communication system. Changes to this interface may be made to optimize group communication performance. No changes to the infrastructure side of this interface are desired, except an implicit requirement for RTP/UDP/IP Header Compression in base stations in order to support media broadcasting using RTP (Real Time Protocol).

Alternatively, CDs 202, 204, and 206 could support most group communication activities using Quick Net Connect (QNC) and IS-707.4, as described later.

CM 218 communicates with CDs participating in group communications via transport and group communication application layer protocols. These communications include application signaling (PTT transmission privilege requests, net registration, etc.) as well as the real-time voice media packet streams distributed by CM 218. All real-time media are distributed via dynamic RTP/UDP/IP interfaces on CM 218 and CDs. If CRTP header compression is unavailable (a well-known header compression technique), real-time media is encapsulated directly within UDP/IP packets, or datagrams. All real-time signaling occurs via dynamic UDP/IP interfaces on CM 218 and the CDs. Other signaling may take place via a predefined data protocol interface, such as TCP/IP, between CM 218 and the CDs using the well-known Session Initiation Protocol (SIP), an application-level call signaling protocol designed to support Internet telephony.

CM 218 provides an external user interface to communicate with external users using the same transport and group communication application layer interfaces used to interact with the CD 208, except that these protocols will operate over IP/PPP and a dial-up modem connection.

CM 218 provides an administration interface which is an application level protocol that provides administrative access of a CM user, net, and administration database and associated parameters using Hyper-Text Markup Language (HTML) semantics. In one embodiment, the interface operates over TCP/IP. A second network interface supporting administrative functions may also exist. This second administrative interface supports the bulk of real-time transfers of administrative information, including membership lists and network status reports, to Java or similar client administrative applications.

SM 228 communicates with CDs using a re-keying protocol operating over TCP/IP.

One embodiment of the system and method for providing group communication services operates over standard air interface IP packet data services, for example, as defined in IS-707, and conventional IP. One traffic channel is allocated per registered CD while a net is active, i.e., media being transmitted between members. Each net is defined and identified by its name, which when combined with the address of a host system, defines a destination address which can be expressed in the form of a SIP URL. As previously mentioned, SIP (Session Initiation Protocol) is a well-defined signaling protocol used to control setup and control signaling between CDs and CM 218. A SIP URL, then, can be defined as:

sip: <net>@<nbsdomain> where net denotes the name of a net defined in the context of a group communication system denoted by nbsdomain. A net's name is an alphanumeric tag which uniquely identifies the net within the communication system. The nbsdomain is a virtual system domain (or subdomain) which defines an address space in which each net's net-address resides. The nbsdomain, as well as the names of all nets available in the system, are defined through privileged CM 218-based administration actions.

For example, the net localpolice defined within a domain nbs.acme.com would have a corresponding net-address of:

sip:localpolice@nbs.acme.com

A group communication system domain includes a top-level SIP redirect server which maintains SIP registrations for the domain and acts as the initial rendezvous point for all SIP signaling. The top-level server may consist of multiple servers acting as a single logical entity and sharing a common dataset in order to provide reliability and scalability guarantees. In addition, a group communication system domain may include a logically separate top-level SIP (redirect) server. This is to ensure that each CD maintains an Internet network address of both a primary and secondary top-level SIP server.

Figure 4:
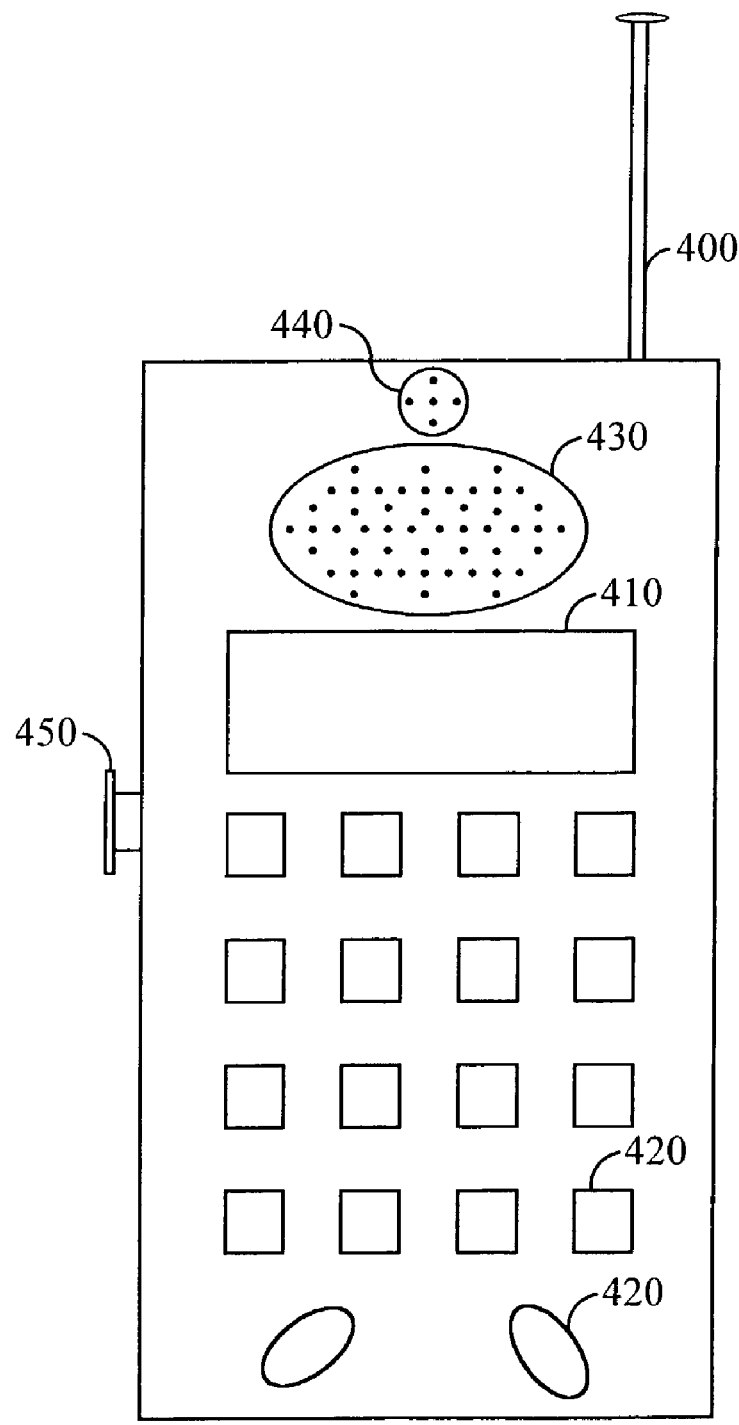
FIG. 4 illustrates a typical communication device used in the group communication of FIG. 2.

FIG. 4 illustrates CD 202 as used in one embodiment of the system and method for providing group communication services. Further details of CD 202 may be found in copending U.S. patent application Ser. No. 09/518,776, entitled "METHOD AND APPARATUS FOR PARTICIPATING IN A GROUP COMMUNICATION SERVICE IN AN EXISTING COMMUNICATION SYSTEM, filed on Mar. 3, 2000, assigned to the assignee of the system and method for providing group communication services, and is incorporated by reference herein. In this embodiment, CD 202 is a wireless telephone capable of converting media, typically human speech, into data packets suitable for transmission over data network 214, such as the Internet. It should be understood that many of the features incorporated into CD 202, as shown in FIG. 4, may also be implemented in any communication device, and that CD 202 is not intended to be limited to a wireless telephone as shown in FIG. 4. CD 202 typically comprises an antenna 400, a display 410, keys 420, a speaker 430, an earpiece 440, and an optional push-to-talk (PTT) switch 450. Display 410 and keys 420 are herein collectively referred to as a user-interface. In an alternative embodiment, CD 202 may use one of the existing keys 420 as a push-to-talk switch when in a push-to-talk mode of communications instead of using a dedicated push-to-talk switch 450.

CD 202 may also be equipped to transmit and receive data communications by integration with any data processing device such as a portable or fixed computer system, a position reporting system, or a meter reading system. CD 202 may interface to such a data-generating device using an interface cable, having one end of the interface cable connected to the data processing device and the other end connected to a communication port (not shown) on CD 202. Alternatively, the necessary internal components of CD may be integrated into the data processing device to form a single unit suitable for transmitting and receiving data and/or voice communications in an integrated package. In either case, CD 202 can be used to transmit data from the data-generating device to one or more net members, or to one or more non-net members, or a combination of both.

CD 202 is generally capable of communicating using one or more modes of operation or "service options." However, it should be understood that the none of the embodiments of the system and method for providing group communication services rely on a communication device having multiple modes of communication. A first service option is used to place standard audio calls from a CD 202 to base station 216. The voice service mode is used to make typical point-to-point telephone calls using the given technology of the associated communication system. For example, the voice service option for CD 202 refers to point-to-point audio communications using IS-95A, a well-known CDMA telecommunications standard promulgated by the Telecommunications Industry Association. The voice service option for CD 208 refers to a standard point-to-point telephone call using PSTN 222 to connect to another wireless or wireline telephone.

A second service option is defined as a data service option, which further can be divided into at least three types of data services: packet data service, asynchronous data service, and synchronous data service. In a CDMA communication system, an asynchronous data service is described by IS-707.5 while a synchronous data service is described by IS-707.4. The various data service options are alternatively implemented using techniques applicable to various other types of communication systems, such as GSM systems.

Either type of data service allows CD 202 to communicate with MSC 220 using data protocols, rather than transmitting information using the traditional voice service mode. As explained previously, MSC 220 contains an IWF which routes data packets between CD 202 and CM 218. CD 202 contains circuitry which accepts information such as audio, video, and data, and converts the information into data packets in accordance with a data network protocol such as the well-known TCP/IP protocol.

When used in the voice service mode, a net member uses keys 420 to enter data into CD 202, the data typically comprising an identification number, such as a telephone number, of a second communication device belonging to a person whom the user wishes to communicate. Keys 420 are also used in conjunction with display 410 to choose various communication options. For example, if a member wishes to enter the packet data service option to join a particular net, keys 420 can be used to select one of several possible nets using a menu of options viewable from display 410. CD 202 maintains a list of nets internally which represents the set of known nets in which CD 202 can participate. Alternatively, CD 202 maintains a list of all possible nets, whether CD 202 can participate or not. The list may be updated as necessary during interactions with CM 218. The list maintained by CD 202 is analogous in function to a phone-book feature, which is a list of names and dial-numbers which are typically maintained in a standard wireless telephone. The list of nets may be integrated with the phone-book feature so that the act of selecting a net from the net list instructs CD 202 to attempt to join the selected net.

Nets may be designated as either secure or clear nets. Clear nets are nets which do not employ over-the-air eavesdropping security guarantees, such as encryption, while secure nets have provisions for providing encryption. Secure nets are described later herein.

In order to participate in a specific net, CD 202 initially requests that CM 218 add CD 202 to a list of connected net participants for the desired net. The term "connected" means those users who have registered with CM 218 and are at least receiving communications occurring in a net. Hence, CD 202 will initially know or be able to learn the net-address of any nets in which it wishes to participate. Further, CD 202 will initially know or be able to be configured with the address of a top-level server to which SIP requests may be sent.

In one embodiment, CD 202 is preprogrammed with the address of a known or default top-level SIP server which can provide a current list of nets in which CD 202 is authorized to participate. Alternatively, CD 202 may be preprogrammed with a group-list, which defines at least one net-address in which CD 202 is a member. CD 202 can later send a request to the top-level SIP server to update its group list. In another alternative embodiment, CD 202 contains no preprogrammed SIP addresses or group list information. In this embodiment, a user is provided with a top-level SIP server and net address to interactively enter this information into CD 202 using keys 420. The user may also enter additional net-addresses to a group-list which has already been programmed with entries. This embodiment is analogous to entering personal names and dial-numbers into a conventional wireless telephone phone book.

In one embodiment, CD 202 is also preprogrammed with the IP network address of a primary Domain Name Service (DNS) server, to which CD 202 can send DNS queries. Typically, the address of a DNS server operated by a CDMA cellular carrier will be preprogrammed. CD 202 may also be preprogrammed with the IP network address of an alternate DNS server.

In order to support SIP authentication, CD 202 may use security measures such as Pretty Good Privacy (PGP). CD 202 is preprogrammed with a unique PGP user-id and secret key which it can use to sign SIP transactions when requested by CM 218. The PGP user-id can also be used as a user address for CD 202 for generic SIP transactions, such as INVITE messages.

CD Database

Generally, each CD maintains a database for storing information pertaining to group communications. For example, a list of nets in which the CD is able to join, known as a group-list, is stored in the database. The CD database may store up to 25 entries or more.

In one embodiment, each entry in a CD database includes the following fields:

1. Net-address

The net's formal SIP net-address which a CD uses to request to join the net as an active participant.

2. Net security advisory flag

The clear/secure advisory flag distributed by CM 218's SIP server in its list of available nets or set by the user to indicate that a net is defined to carry secure media traffic.

3. Net traffic encryption key

The traffic encryption key used to encrypt and decrypt all media traffic for secure nets.

4. Dormancy reconnect timer

The length of the interval, in seconds, a CD will wait when in the dormant state between transitioning to the connected state and confirming that a data call remains valid and the basestation has not unilaterally dropped the connection.

Finding and Joining Nets

CD 202 can join or leave nets by using call signaling defined by the Session Initiation Protocol (SIP). Each CD 202 is provisioned with a list of net-addresses, and one or more top-level SIP server addresses. If the group-list is empty, the user may interactively specify the address of an existing net. If no top-level SIP server has been defined, the user may interactively specify the address of a top-level SIP server.

Once a top-level SIP server address is known, CD 202 may request an updated list of nets available to it by placing a call using the SIP "INVITE" command to a pre-defined SIP destination. The top-level SIP server may redirect the request to an internal destination or respond to it directly. The INVITE response to this call includes the current list of nets available to CD 202. CD 202 uses this list to update its internal group-list.

After a net has been selected, CD 202 attempts to join the net via the SIP INVITE method by specifying the net-address as the invitation destination and sending the request to the top-level SIP server. The top-level server attempts to map the net-address to a known destination and, if successful, redirects CD 202 to the corresponding SIP user-agent server destination associated with the net's currently assigned multipoint control unit (MCU), which is a portion of CM 218 responsible for managing net traffic. If no mapping is available, the invitation fails.

Normally, the destination SIP user-agent server confirms that CD 202 is authorized to participate in the selected net and responds to the invitation, embedding a description of the media traffic and signaling parameters to use to participate in the net in the content of its response. CM 218 may also reply with an error if it is unable to confirm CD 202 as a legitimate member of the net or if some other error condition arises, such as a failure which precludes normal net operation. If the invitation is accepted, CD 202 acknowledges the response via the SIP "ACK" command. Note that other transient response codes which indicate call progress may also be received by CD 202 while the invitation is being processed.

CD 202 is responsible for updating its group-list to the set of the nets in which it may participate. The user may command CD 202 to query CM 218, even when no net-address is selected, for the purpose of receiving updates to its group-list. If CD 202 determines that it has been added or removed from a net, it will briefly display an appropriate message to the user (for example: "Added to group WELDERS") and/or possibly prompt for user interaction. If CD 202 determines that is not a member of any net, it will similarly inform the user. CD 202 may automatically incorporate new net addresses into its group-list but may prompt the user before deleting addresses of nets in which it has lost membership from the group-list.

At any given time, no more than one net in a CD's group-list may be selected. A default net may be initially selected or the user may select a net from the group-list.

CM 218's SIP user-agent server's response to an INVITE request to join a net includes, as embedded content, the net's media and real-time media signaling destination addresses, as well as other net parameters (such as media payload format descriptors). Once confirmed, CD 202 briefly displays feedback to the user, indicates whether the user has listen-only privileges, and enables group service functions. If CM 218 determines that CD 202 is not a member of the selected net, or an error or other exceptional condition occurs, CM 218 responds with a corresponding error response. When such a registration is rejected, CD 202 briefly displays a corresponding error message and group service functions remain idle.

Active Group Communications

Figure 5:
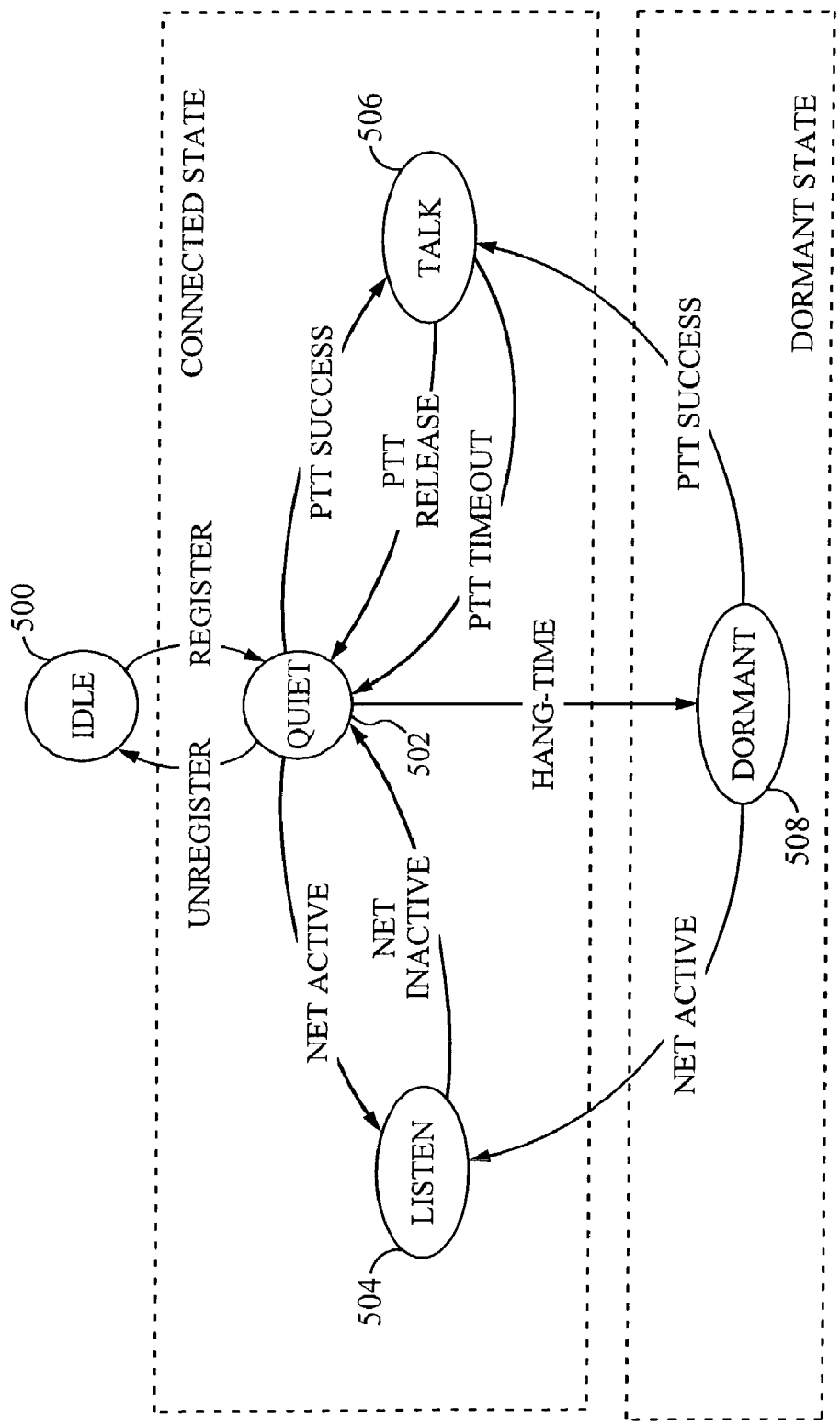
FIG. 5 is a state diagram illustrating the various operating states of the communication device of FIG. 4.

FIG. 5 is a diagram illustrating the various states in which a CD may reside during operation. Other configurations are, of course, possible. It should be understood that the states shown in FIG. 5 are applicable to any CD, with the exception that the dormancy state, defined below, generally does not apply to CDs who do not communicate using data services.

Upon power-on, a CD enters the idle state 500, which enables at least one service option, such as the voice service option, although CD 202 could alternatively operate in any desired service option. After joining a net, a CD initializes and opens its real time protocol (RTP) media traffic channel and a separate group communication media signaling channel to the CM 218 destination addresses provided in a successful invitation response. Once these channels have been initialized, group-services are activated on a CD, and it enters the group-service quiet state 502 with the ability to receive media traffic from the net and request permission to send voice traffic.

With group services active, a CD monitors its media traffic and signaling channels to CM 218. Voice data received on the media channel are decoded and presented using speaker 430 or earpiece 440, according to the current user configuration. A CD may display the identity of the current speaker, as identified via real-time media signaling. If the identity of the current speaker is unavailable, a CD may display the current selected net name as listed in the group-list. A CD may also tabulate media traffic statistics (for example, total time spent talking, listening, and monitoring, estimated media traffic receipt packet loss) and make these available to the user as a diagnostic via a menu option. While receiving traffic from the net, a CD transitions to group-services listen state 504, returning to quiet state 502 when voice traffic stops.

At any time, the user may request permission to speak to the net by depressing the PIT button and causing a CD to signal CM 218 (specifically, the net's MCU) with a floor-control request. CM 218 responds by either granting or denying the request. If a CD has listen-only privileges (that is, a CD has a priority-level of zero within the selected net), the request will be denied. If denied, a CD may alert the user with an error tone, display a suitable error or explanatory message, or both, and returns to quiet state 502. In one embodiment, a CD will insist that PTT switch 450 be released and depressed again before attempting another floor-control request. If granted, a CD enters the group-services talk state 506, signals the user with a brief audible tone, and begins transmitting media traffic to CM 218 for as long as PTT switch 450 is keyed. At any time, CM 218 may signal CD 202 that it has lost control of the floor. Upon receipt of such a signal, CD 202 will abort transmitting media traffic and alert the user with an error tone until PIT switch 450 is released, at which point it returns to quiet state 502. Otherwise, once PTT switch 450 is released, CD 202 signals CM 218 that it has released the floor and returns to quiet state 502.

A user may switch to a different net by selecting another net from the group-list whenever group-services within CD 202 is in quiet state 502, listen state 504, or dormant state 508, described below. When a new net is selected, CD 202 will signal CM 218 to remove it from the current net through SIP call-setup mechanisms and then follow the procedures outlined earlier to join the new net. If the process of joining the new net fails, CD 202 is no longer a member of any nets and group services within CD 202 return to idle state 500.

Should CM 218 discover that CD 202 requesting the floor of a particular net is the only registered member of the net in question, it will deny the floor-control request and signal an indication that CD 202 is the only registered net member, called a lonely-user error, which CD 202 will display to the user. Although a net may exist with only one registered member, a net generally will not relay media traffic unless there are least two registered members.

When any CD has the floor of a net, the net is said to be active; otherwise, it is inactive. If a net is inactive for a time exceeding a predetermined time period, called the net's hang-time, CM 218 may put the net in dormant mode 208 by individually signaling all registered CDs to release their over-the-air traffic channels as described by IS-707.5, or whatever over-the-air data service is being used. Enough state is maintained to allow a floor-control request or other traffic to bring the net out of dormant mode 508 relatively quickly. Net members may ignore the "go dormant" message. CM 218 does not explicitly or implicitly track the dormancy status of individual net members.

Typically, CM 218 will "wake-up" a net and bring the net out of dormant mode 508 when a successful floor-control request is received during dormancy. As soon as the floor-control request has been granted, CM 218 will signal each registered CD by requesting an "are-you-there" (AYT) response over the media signaling channel and start an internal wake-up timer. In one embodiment, each CD is required to acknowledge receipt of the AYT to CM 218 if it wishes to remain registered in the net. Optionally, a dormant CD 202 may buffer media traffic from the time the user keys PTT switch 450 until a traffic channel assigned to CD 202 is (re)connected. CM 218 may buffer media traffic received from the talking CD 202 until the wake-up timer exceeds a wake-up timeout, at which point, it will begin forwarding media traffic to each registered CD—including, in one embodiment, any members which have not yet responded to the AYT request. CM 218 may periodically retransmit AYT requests to any registered CD which has not acknowledged receipt of the AYT. Once the wake-up timer has exceeded a second, longer time period called the "late-riser" timeout, CM 218 will unregister any member CD whose AYT acknowledgement is outstanding and stop the wake-up timer. CM 218 ignores duplicate AYT responses.

If a CD attempts to join a net that is currently dormant, CM 218 will process the request normally and then signal CD 202 to go dormant. The signaled CD may ignore the go-dormant command.

Interaction with Point-to-point Services

CD 202 allows the user to originate and receive conventional PSTN point-to-point calls as well as participate in group communications. Typically, CD 202 will support at least a group communication application and one or more point-to-point applications. Hence, one embodiment of the system and method for providing group communication services allows seamless receipt and placement of point-to-point voice-services calls while group services are enabled and activated.

CD 202 may be used to place a point-to-point voice services or secure point-to-point voice data calls at any time, whether group services are active or not, as long as CD 202 is not simultaneously acting as a talker. If CD 202 has registered as a member of a net, CD 202 should unregister from the net when placing a point-to-point call. If the selected point-to-point call will be placed via a voice service option, CD 202 will also terminate data services. Once the point-to-point call has been completed, CD 202 may transparently enable data services and re-register as a member of the current selected net.

CD 202 may be used to receive PSTN or secure point-to-point data/voice calls while group-services is enabled, within the limitations imposed by the particular air-interface cellular infrastructure. If CD 202 has joined a net, and the selected net is active, CD 202 will appear busy to an incoming PSTN call and the call will be given the appropriate busy treatment by the air-interface cellular infrastructure. If the selected net is quiet but the net's hang-time has not expired, the call will also be given the normal busy treatment by the air-interface cellular infrastructure. However, if the selected net's hang-time has expired, and the net has been placed in dormant mode, and CD 202 has released its over-the-air resources, the call may not be given busy treatment by the infrastructure and CD 202 may be paged to initiate receipt of the incoming call.

In one embodiment, while a voice services call is active, CD 202 is unable to receive any net traffic. After a voice services call has been completed, CD 202 may be required to (re)-join the net as it may have missed one or more AYT requests.

Whenever CD 202 appears busy to an incoming voice services call, the caller will be redirected based on whatever busy treatment has been defined for the called CD (call forwarding, voice mail) by the cellular infrastructure, as expected.

A user may optionally configure CD 202 to disable receipt of incoming point-to-point calls while a net is selected and CD 202 is registered as a member.

Communications Manager

Figure 6:
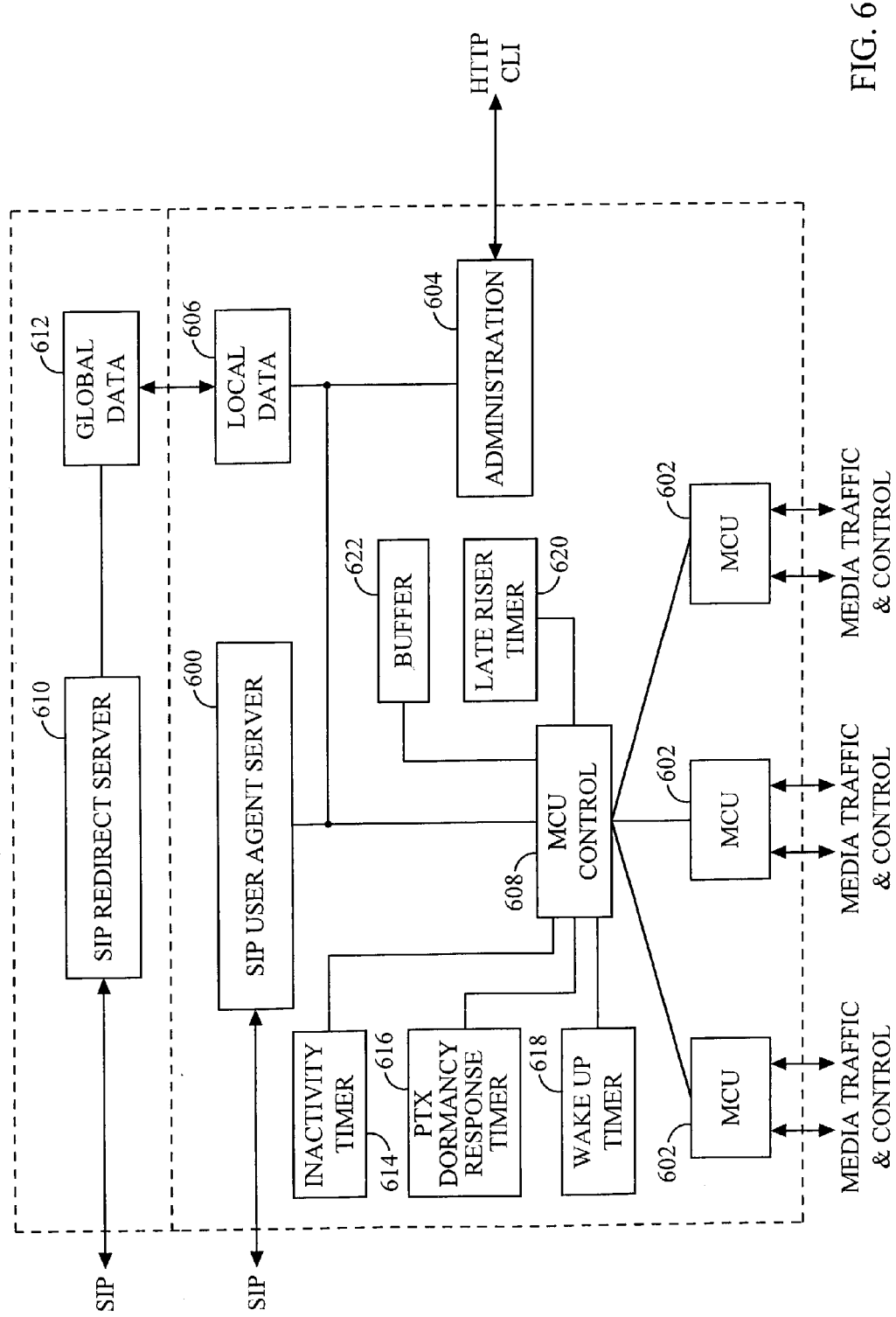
FIG. 6 is a functional block diagram of a communications manager used in the group communication system of FIG. 2.

FIG. 6 illustrates a functional block diagram of CM 218. Further details of CM 218 may be found in copending U.S. patent application Ser. No. 09/518,622, entitled "METHOD AND APPARATUS FOR ENABLING GROUP COMMUNICATION SERVICES IN AN EXISTING COMMUNICATION SYSTEM", filed on Mar. 3, 2000, assigned to the assignee of the system and method for providing group communication services, and is incorporated by reference herein. CM 218 supports at least three logical external interfaces, which, in one embodiment, are all IP based, and which may all have multiple instances operating simultaneously. A SIP interface is provided by SIP user agent server 600. Real-time media signaling and control are supported by one or more media control units (MCU) 602. Administration functions are supported by a combination of CLI and HTTP servers, shown in FIG. 6 as administration interface 604.

Internally, MCUs 602 may be managed by a control function which assigns an MCU 602 to nets and SIP invitations to MCUs. Local memory 606 stores information relating to individual net members (referred to herein as a user database) and information relating to various nets (herein referred to as a net database). External access to local memory 606 is controlled through administrative interface 604.

No assumption is made as to whether CM 218 is implemented as a single physical entity, or several entities connected via a high-speed internal communication path. It may be deemed necessary, for example, to dedicate special-purpose hardware to handle the real-time media switching loads, or use a physically separate database engine to host local memory 606. Likewise, top-level SIP redirect server 610 and global database 612 may be separated from the media or administrative functions and implemented as a separate entity.

In one embodiment, CM 218 comprises a SUN workstation, model NETRA T1. However, in an alternative embodiment, CM 218 could be implemented in any hardware configuration, including discrete components, one or more ASICs, other computing systems, computer architectures, state machines, and the like, and various combinations thereof. In addition, CM 218 could be implemented in software or firmware, as apparent to one skilled in the relevant art.

Both top-level SIP redirect server 610 and SIP user-agent server 600 associated with the MCUs require access to user and net information defined in the system. Specifically, top-level SIP redirect server 610 may either query global database 612 or be given explicit SIP registrations in order for it to redirect incoming INVITE requests to a corresponding appropriate destination (in most cases, user-agent server 600). Similarly, SIP user-agent server 600 requires access to local memory 606 to authenticate users, confirm users' access to nets, and define nets' session descriptions.

Local memory 606 receives user and net information from global database 612 as an MCU is assigned to a net by redirect server 610. After information has been provided to local memory 606, it can be provided to administrative interface 604, user agent server 600, and/or MCU control 608 on an as-needed basis.

MCU control 608 monitors the operation of individual MCUs, such as controlling startup and/or shutdown, assigning a net to an MCU 602, and sharing of status information between local memory 606 and various CDs and/or administrative interface 604. MCU 602 is typically a digital signal processing device capable of executing a set of program instructions stored in a memory, such as a ROM.

MCU 602 is responsible for receiving incoming data packets from a transmitting CD and for sending duplicate copies of the received data packets to other members of the net to which the transmitting CD belongs. As each data packet is received by MCU 602, it is stored in a memory (not shown). The transmitting CD may be identified by interrogating the data packet. In one embodiment, an IP address representing the transmitting CD is included in each data packet as a way to perform the identification.

After the transmitting CD has been identified, MCU control 608 retrieves a list of net members belonging to the net associated with the particular MCU 602 from local memory 606. (each MCU is assigned to one net only). A destination address is associated with each active net member, i.e. net members who are presently registered with MCU 602, in local memory 606. In one embodiment, the destination address is an IP address. MCU control 608 then creates a duplicate of the original data packet, except that the destination address identified within the data packet is modified to reflect the destination address of the first net member. Next, MCU control 608 creates a second duplicate data packet, addressed to the second net member. This process continues until the original data packet has been duplicated and sent to all of the active net members identified in local memory 606.

PSTN User Interface

As stated previously, CD 202 comprises a wireless telephone in one embodiment. However, because many of the embodiments of the system and method for providing group communication services use extensive IP and IP transport protocols, any IP capable platform with connectivity to CM 218 can potentially serve as a CD.

Hence, dial-up users (i.e., a user operating a device which communicates primarily through the PSTN) may connect to CM 218 through existing IP terminal-servers operated by Internet Service Providers (ISP). An IP terminal-server acts as a bridge between the PSTN and a local area network (LAN) supporting IP. It consists of a bank of modems, which provides a connection point for PSTN modems, a server, and one or more network interfaces. The server is capable of hosting multiple independent PPP sessions, one for each connected modem user. The server also acts as a router, routing IP packets between each of the individual PPP interfaces and any active LAN interfaces. In one embodiment, an integrated IP terminal-server is used and in another embodiment, an external IP terminal server is used. Both server types are readily available commercially.

The dial-up terminal server ideally supports the ability to negotiate CRTP Header Compression over a PPP session. Similarly, the PPP stack used by a dial-up client should also include and attempt to use CRTP. However, because of the additional bandwidth available over high-speed modems, the inability for a dial-up based user to negotiate CRTP Header Compression may not necessarily force a net to avoid using RTP based payload specifications.

If the terminal-server is located on a cellular service provider's internal LAN, and hence near, in a network topology sense, to the service provider's CM 218, dial-up users may avoid quality-of-service issues that can contribute to high end-to-end latency if the path between the ISP's terminal-server and CM 218 traverse a portion of the Internet.

PSTN-based net participants follow similar SIP registration procedures as outlined for wireless users, join nets in a similar manner, adhere to a similar media signaling protocol, and encapsulate packets within RTP or UDP based on the net's session description and according to the payload specifications described previously.

Since PSTN based modems generally do not support a dormancy concept similar to that described above, dial-up based net participants generally ignore any sleep messages received from CM 218.

CM Databases

In one embodiment, CM 218 maintains at least two distinct databases which capture information that support net activities: a net database and a user database, both stored in local memory 606 and/or global database 612. Information supporting administration activities and privileges may be stored in either database, or a third functionally distinct database.

User Database

The user database tracks individual users of the group communication system. The user records contained within a CM's database may or may not necessarily be members of nets defined in CM 218's net database.

Each record in the user database comprises one or more fields for storing pertinent data corresponding to each CD. In one embodiment, each record comprises a user name field, a user ID field, a vocoder list field, a dial number field, a user type field, a CD user address, and a CD PGP public key. One or more other fields may also be used. Of course, in other embodiments, each record may comprise different information than disclosed above.

The user name field identifies a formal name associated with a particular CD 202, such as "Jane Doe". The user ID field is a unique code which further identifies the user, such as "17882". The vocoder list field identifies a list of vocoders supported by CD 202 associated with the user. The list may include vocoders not supported by the group communicaiton system. The dial number field identifies the dial number assigned to CD 202 assigned to the user. This field is empty, or null, for generic Internet users, i.e., for CDs which do not support standard voice services. A user type field denotes whether the user is a cellular or a generic Internet user. In one embodiment, users who connect to CM 218 via PSTN dial-up are considered generic Internet users. The CD user address field identifies a unique user address for CD 202. A CD known by multiple user addresses will generally have multiple corresponding entries in the user database. The CD PGP public key field stores a PGP public key associated with CD 202 user address. Alternatively, other types of keys can be stored in this field.

Net Database

The net database defines a set of nets known to CM 218. The net database also lists the defined members of each net—those users who may request to join and become participants in a net. Each record in a net database comprises one or more fields for storing pertinent data corresponding to each net. In one embodiment, each record comprises at least a net identifier field, a net-address field, a net owners field, a net security field, an arbitration scheme field, a net vocoder field, a PTT fail-safe field, a hangtime time-out field, a PTX Dormancy Response timeout field, a wake-up timeout field, a late-riser timeout field, an AYT timeout field, a media channels field, and a net membership field. Additional fields may be added, or a number of fields may not be necessary, depending on the features and capabilities of a particular application. Each field is described as follows.

The net identifier field comprises a unique identification code, identifying particular nets within the context of CM 218. The net-address field comprises a SIP compatible net-address of the corresponding net. The net-owners field comprises a list of users, identified by user identifiers, who have administrative privileges for the correspoding net. The net security status field comprises an indication of whether the corresponding net is clear or secure. In an alternative embodiment, this field could identify various levels of security, such as none, classified, and secret. The arbitration scheme field comprises a unique value identifying an arbitration scheme used to resolve PTT arbitration conflicts between net participants. The net vocoder field comprises a value identifying a standard vocoder shown in the net's advertised session description. Net members incorporating such a vocoder in CD 202 will have this vocoder listed in their list of supported vocoders. The PTT fail-safe field comprises a maximum time that a net participant may transmit media to the net before CM 218 will revoke the talker privilege. The hang-time timeout field comprises a maximum time that the net may remain idle before CM 218 will place it in the dormant state. The PTX dormancy response timeout field comprises a maximum time that CM 218 will wait after determining that a dormant net's talker privilege can be granted before transmitting a PTX message to a requesting CD. The wake-up timeout field comprises a maximum time that CM 218 will wait for net participants to respond to an AYT "wake-up" message before granting an outstanding PTT request. The late-riser timeout field comprises a maximum time that CM 218 will wait for a CD to respond to CM 218's AYT "wake-up" message before CM 218 will remove the non-responding CD from the net's list of active participants. The AYT timeout field comprises a maximum time that CM 218 will wait for a CD to respond to an AYT "wake up" message before CM 218 will remove CD 202 from the net's list of active participants. The media channels list field comprises a list of media channels, including payload specifications, for the net. Each net will generally list at least one media channel which transports voice. Secure nets may list a second data channel. The net membership field comprises a list of defined members of the net and associated net specific privileges.

As stated above, the net membership field defines a set of users who may request to join the net as participants. Each entry in this field may comprise further informaton corresponding to each net member, such as a priority level, and an authorization list. Other information may be defined for each member as well. The priority level is generally used by a net's PTT arbitration algorithm for resolving PTT conflicts. A priority level may be defined to allow listen-only privileges. The authorization list defines authorization privileges, if any, a user has for the net. Privileges may include the ability to add, edit, or modify entries in a net's membership list and the ability to modify other net parameters.

Net Administration—CM Administration Interface

In one embodiment of the system and method for providing group communication services, CM 218 includes a separate administration interface 604 through which CM 218 may be administrated and real-time status reports regarding CM operation obtained. Other variations are possible. The administration interface 604 consists of two network ports, a TCP/IP based Hyper Text Transfer Protocol (HTTP) interface supporting administrative access through a conventional Java-capable web browser, and a TCP/IP based group communication specific Command Line Interface (CLI).

Administrative functions are supported through a TCP/IP based CLI. Prior to being granted access to the CLI, a potential administrator connecting to CM 218's CLI interface will be authenticated, using well-known techniques.

The CLI is able to be contacted on a well-known, fixed, TCP port address and able to simultaneously manage multiple CLI sessions.

The CLI is capable of supporting several administrative functions, such as creating a new user record in a user database, deleting an existing user record, and modifying an existing user record. Other functionality may include the ability to create new nets in the user database, deleting existing nets, and modifying existing nets. Still other functions may include the ability for an administrator to list all users by user name, dial number, user identifier, as well as other criteria, the ability to list all nets, by net-address and net identifier, in the Net Database, the ability for an administrator to show all fields for a specific user record, and the ability for the administrator to show all fields for a specific net identified by the net's net identifier or net address. The CLI may further include the ability for an administrator to query for a static status report for a specific net, or individual net member. This function may also allow the administrator to query for real-time (updated) reports, and, in particular, allow the administrator to identify the current list of net participants, the current talker, the presence or absence of media traffic, and identify any media signaling messages sent or received by CM 218.

In one embodiment, CM 218 makes administrative functions available to a generic web browser via a HTTP web server interface with one or more pages formatted using Hyper Text Markup Language (HTML) syntax. At least one of the administrative pages may include a reference to an embedded Java applet.

Some administrative functions may optionally be performed through HTTP GET and POST commands issued by the web browser using conventional HTACCESS authorization mechanisms. The administrative functions supported are a subset of those supported by CM 218's CLI interface.

The HTTP interface may be used to deliver a Java applet to the web browser. The applet may then rely on CM 218's CLI interface to provide additional administrative functionality to the user through a web browser interface.

CM 218 manages and is the focus for all administrative functions pertaining to net administration, including the creation and deletion of nets; defining new and deleting existing users; adding and removing users as net members; and adjusting various operating parameters at a user, net, or CM-wide basis.

Upon delivery to a cellular, or other, service provider, CM 218 requires basic administrative configuration before it can be used to support group communication activities. Required initial configuration involves basic system configuration: assigning passwords to operating system level accounts for root-level system administration and configuring CM 218 network interfaces for proper operation on a local wireless infrastructure network.

Once CM 218 is configured, general net administration can take place. In one embodiment, net administration functions take place through a HTML or other network interface built over TCP/IP. Administrators interact with CM 218 using a conventional World Wide Web (WWW) browser. Administration can take place locally or remotely (anywhere on the Internet, or via dial-up). In one embodiment, however, the underlying transport path for administrative access is TCP/IP. Multiple (two or more) simultaneous administration connections are allowed.

Upon connecting to CM 218 for the purpose of net administration, the administrator will generally authenticate itself to ensure that only authorized administrative actions are accepted. Different levels of access are allowed; for example, authorized net members may connect directly to CM 218's administrative interface to modify specific net membership lists, but more generic administrative privileges are reserved for specific administrative accounts. For clarity, administrative actions are separated into those which deal specifically with user definitions and those which define nets. A user definition may include a username, unique CD cellular system identifier, CD phone number, and user e-mail address. CM 218 will also internally define a unique user identifier which may be passed to CD 202 and used to uniquely identify the user in signaling messages. A net definition may include a net-address, net hang-time, private dispatch timeout, and member list. A net's member list consists of a list of member records, which individually contain a user identifier and priority level. A member with the minimal level of priority generally has listen-only privileges.

CM administrators can monitor the current status of nets for which they have administrative privileges. In particular, administrators can determine the current list of net participants as well as monitor the net's state (active, inactive, dormant, in wake-up, etc.). Whenever the net is active, the administrator can also monitor the identity of the current talker. Additional statistics and status, such as the length of current session, total talk time of an individual user or a net, the last time that a particular net member held the transmission privilege, mean number of registrants, etc., may also be available to administrators through the administrative interface 604.

CD 202 may also support the concept of a "private call"—a half-duplex point-to-point call instigated by the caller pressing the push-to-talk button which is accepted without ringing the callee phone, as occurs in a traditional full-duplex point-to-point call.

Network Protocols

The operation of one embodiment of the system and method for providing group communication services can be described and defined at two levels which generally operate independently of each other. The lower level, which comprises a physical, link, network, and transport layer, is described here. The upper level, which comprises group communication and related application level protocols, is described later herein.

One embodiment of the system and method for providing group communication services operates over standard Internet and related protocol stacks, such as that provided by the IS-707.5 Packet Data Service Option in a CDMA communication system. Of course, other embodiments could alternatively use a data service applicable to the particular type of communication system being used, such as a GSM communication system. Various embodiments of the system and method for providing group communication services may also operate over V.32bis, V.90, or similar PSTN modem standards, or be used entirely within the public Internet, independently of any IS-707.5 segments.

Most group communication network traffic can be described as either signaling or media traffic. Signaling traffic can be further differentiated into two distinct categories: call setup and control signaling, which consists primarily of SIP invitation requests and acknowledgements, and media signaling, which comprises primarily real-time floor control requests and related asynchronous messages. Media traffic comprises real-time point-to-multipoint voice or data broadcasts.

Signaling Protocols

Group communication call setup and call control signaling is performed in accordance with the well-known Session Initiation Protocol (SIP), although any signaling protocol may be used in the alternative. Although SIP may be transported using either the User Datagram Protocol (UDP) or Transmission Control Protocol (TCP), CD 202 performs all SIP based signaling functions using UDP in one embodiment and CM 218 expects to receive all SIP signaling requests via UDP.

In one embodiment, CM 218 implements both a SIP user-agent server and a SIP redirect server. To support group communications, CD 202 implements a SIP user-agent client. CM 218 operates by listening for incoming SIP connections on an advertised port, in one embodiment, UDP port 5060. When a connection occurs, the SIP server receives and processes requests according to SIP call-signaling conventions. The server is capable of processing multiple call-signaling connections in parallel.

To conserve network resources, CD 202 may release its UDP connection with the SIP server after it has successfully (or unsuccessfully) joined a net. The UDP connection can be reinstated later to send additional SIP call-signaling requests (for example, to leave a net or switch to another net).

Because UDP provides unreliable, connectionless transport, application level reliability guarantees are necessary to ensure robust communication. These guarantees are implemented by SIP-compliant endpoints, i.e., the CDs in communication system 200. SIP call-signaling UDP streams are encapsulated within a data network protocol, such as IP. No special formatting is required. SIP call-signaling IP packets exchanged between a wireless-based CD or a dial-up PSTN-based CD 208 are encapsulated within PPP. Again, no special formatting is required.

In one embodiment, SIP call-signaling PPP frames exchanged between a cellular-based CD 202 and a base station 216 are encapsulated within the Radio Link Protocol (RLP), a well known wireless protocol for transmitting data over-the-air. For dial-up PSTN-based CDs, an appropriate modem standard, such as V.32bis or V.90, replaces RLP. In either case, no special treatment is required and an error-free physical link is not required.

In one embodiment, group communication media signaling, as well as voice and data traffic, are transported using UDP/IP datagrams. When CRTP header compression is available, media traffic may be further encapsulated using RTP at the application layer and header compression techniques are applied as appropriate to UDP/IP incoming and outgoing UDP/IP traffic.

Media signaling requests and responses are encapsulated within UDP datagrams. When available, CRTP header compression may be applied to reduce the impact of sending uncompressed UDP/IP headers.

Each CD dynamically selects a UDP port on which it intends to listen for group communication media signaling requests and communicates the port number to CM 218 as part of the SIP invitation it delivers when attempting to join a net.

A net's CM media signaling destination address (including the UDP port, number) is described in the net's session description delivered as part of a successful SIP INVITE request's response. Unlike SIP signaling addresses, media signaling destination addresses are net specific and may change between instances of CD 202 joining a net.

In one embodiment, multiple nets hosted by the same CM operate independently and do not share media signaling or media traffic ports.

Media Traffic (Voice)

Voice traffic from CD 202 is encapsulated by grouping one or more data frames representing voice information within an RTP/UDP or UDP payload. In one embodiment, the data frames comprise frames generated by a vocoder inside CD 202. The use of RTP with CRTP enabled is recommended to minimize end-to-end media latency and provide interoperability with future IP telephony applications and services. In either case, CD 202 dynamically selects the UDP port on which it expects to receive media traffic and communicates the port number to CM 218 as part of the SIP invitation it delivers when attempting to join a net.

CM 218 describes the net's vocoder and transport encapsulation protocol, as well as its media traffic destination address (including the UDP port number), in the session description response to a successful SIP invitation request. Like a net's media signaling addresses, the media traffic destination addresses are net specific and may change between instances of CD 202 joining a net.

Normally, voice traffic is encapsulated at CD 202 using RTP, which segments each UDP datagram into a RTP header and payload. Voice traffic may optionally be encapsulated purely using UDP, with no RTP encapsulation, typically when CRTP header compression is unavailable or unsupported by a net member. The structure of the UDP payload follows the definition given for a corresponding RTP payload, without the RTP header fields.

The decision to encapsulate media directly into UDP is generally configured by the net's administrator and advertised by the net's session announcement.

Media Traffic (Data)

In addition to voice media, nets may also support arbitrary data broadcasts, such as secure net rekey, email, data files, etc. If a net supports a data broadcast channel, CM 218 will advertise the media type in the net's SIP session description when CD 202 formally joins the net. Like traditional media broadcasts, generic data broadcasts operate over RLP in one embodiment (or a corresponding physical layer) but are considered unreliable transports.

In one embodiment, CD 202 includes the capability to resolve Internet domain names into Internet addresses using the Domain Name Service (DNS) protocol, as defined in RFC 1034. Alternatively, CD 202 operates only as a DNS client or resolver, as described in RFC 1035.

In order for CD 202 to resolve DNS hostnames, CD 202 is preprogrammed with the IP network address of a DNS server. The DNS address should also be configurable by CD 202 service provider and, optionally, by the user.

CM 218 may optionally be configured to act as a DNS server, as described in RFC 1035. Although it may respond to DNS requests from foreign entities using TCP as the transport protocol, CM 218 also encapsulates DNS messages using UDP.

Extension to Cellular Multicast Channel

The various embodiments of the system and method for providing group communication services has been designed to take advantage of the development of a cellular multicast channel, if available. Such a channel generically allows one transmitting station to address multiple listening stations, or CDs, directly, without the need for multiple separate rebroadcasts of the transmitted data.

To take advantage of the efficiencies provided by a cellular multicast channel, a net's media signaling and traffic destination addresses would become conventional IP multicast channels, and all CM originated media signaling and traffic broadcasts could become multicast broadcasts. CD originated media signaling, traffic broadcasts, and SIP signaling would likely remain as point-to-point communications.

RLP Modifications

The Radio Link Protocol (RLP) may be modified within CD 202 to minimize the latency experienced when link-layer (RLP frame) loss occurs. Such modifications are optional and do not explicitly affect the operation of transport of application layer protocols since neither TCP nor UDP assumes a reliable network (IP) or link-layer service.

A variety of RLP modification strategies are possible. RLP may be modified to send multiple negative acknowledgement (NAK) responses after an initial RLP timeout, thus prompting the remote end to transmit multiple copies of the lost RLP frame and improving the chances of a successful RLP recovery.

RLP may also be modified to never send a NAK (after the RLP timeout expires) and allow dropped RLP frames to force higher levels of the protocol stack to generate errors. Any application level protocols based on TCP will recover routinely via TCP's error recovery mechanisms.

CRTP Header Compression

Nominally, in RTP encapsulated media traffic, the RTP header accounts for 12 bytes of overhead, the UDP header accounts for 8 bytes of overhead, and the IP header accounts for 20 bytes of overhead, for a total of 40 bytes of network and transport protocol overhead. This overhead can be prohibitive for transporting small RTP encapsulated payloads over existing cellular and even some dial-up PSTN channels.

Various embodiments of the system and method for providing group communication services assumes the availability of transparent mechanisms to compress the header fields of IP/UDP/RTP datagrams to reduce the over-the-air bandwidth requirements. A specification for IP/UDP/RTP header compression within PPP (or similar link-layer framing protocols) has been accepted as a standard within the Internet Engineering Task Force (IETF). This specification describes a method, commonly known as CRTP Header Compression, for compressing the header fields of IP/UDP/RTP datagrams over point-to-point networks to two bytes (if UDP checksums are not preserved, or four bytes if UDP checksums are preserved). CRTP employs three basic strategies to compress the IP, UDP, and RTP header fields:

1. Header fields which remain constant over the life of the RTP session are sent once at the start of the session and never transmitted again.
2. Header fields which change slowly or in small increments are encoded differentially.
3. Header fields which almost always change by a constant increment are encoded differentially using second-order differences. The constant increment is transmitted and stored, and updated only when the field changes by an unexpected increment.

Hence, CRTP assumes that both ends of the compressed link maintain a shared set of information or context for each RTP session, which includes the full IP, UDP, and RTP headers (including constant fields), first order differences for fields which typically change by a constant increment, and other related information.

Infrastructure Support

When operating over cellular CDMA infrastructure, one embodiment of the system and method for providing group communication services requires the existence of data services, such as the Packet Data Service Option outlined in IS-707.5 for the transport of signaling and media traffic. In addition, one embodiment of the system and method for providing group communication services makes use of a dormant mode to allow point-to-point voice services calls to be received during extended periods of net broadcast inactivity. If the IS-707.5 Packet Data Service Option is not available, another embodiment allows implementation using a service known as Quick Net Connect (QNC) and IS-707.4

QNC provides a protocol stack identical to that provided by IS-707.5, although it is unlikely that QNC infrastructure will support CRTP header compression. CD 202 can be configured to negotiate a packet connection using QNC rather than IS-707.5, and, if the QNC service is available, treat the connection as a Packet Data Service Option connection.

Dynamic IP (Registration)

In one embodiment, CD 202 is able to detect the fact that its IP network address has or is about to be changed. If CD 202 is participating in a net when the address change occurs, CD 202 again joins the net by invoking the SIP INVITE command, as described below.

The IP network address of CD 202 may change for at least two reasons. A roaming CD may switch cellular systems or cellular networks, and be required to negotiate a new IP network address. Or, CD 202 may experience a service disruption or drop the Data Service Option call for any reason and upon re-establishing service, be assigned a new IP network address. If CD 202 is participating in a net during an address change and does not re-join the selected net in a timely fashion, CM 218 will eventually expire its membership and remove CD 202 from the list for the selected net. CD 202 is removed from the list of active net participants if it does not eventually respond to a series of media signaling AYT request messages, as described below.

IP Mobility Support

RFC 2002 describes an IETF standards track protocol, commonly known as Mobile IP, that allows for the transparent routing of IP datagrams to mobile Internet nodes. One embodiment of the system and method for providing group communication services allows transparent operation over Mobile IP, with little or no modifications to the application or its associated protocol stacks. Like SIP, Mobile IP includes a registration mechanism to locate mobile hosts within the network at large. Unlike SIP, the Mobile IP registration mechanism operates at the network layer and is necessarily tied directly to IP level addressing schemes. SIP registration occurs at the application layer and is defined independently of network level addressing details.

Under Mobile IP, a mobile host (i.e. CD 202) connects to the network via a foreign agent, which assigns CD 202 a "care-of" address. The care-of address is a temporary but legal address to which IP datagrams can be addressed from anywhere on the Internet. CD 202 uses the care-of address to contact its home agent and inform it of CD 202's current care-of address. After confirming the identify of CD 202, the home agent then tunnels packets addressed to CD 202's permanent home address (which normal Internet routing mechanisms will deliver to the home agent directly or to the home agent's network) to CD 202 using the CD 202's care-of address.

Although, in one embodiment, the system and method for providing group communication services can operate over Mobile IP, Mobile IP may adversely impact the end-to-end latency and perceived voice quality of media traffic and signaling if CD 202 joins a net using its permanent address and the home agent is located far, in a network topology sense, from CM 218 and CD 202. In such a case, media traffic may need to be routed over the public Internet or other variable quality service networks, which may not have been required if Mobile IP was not used. To avoid this, in most cases, it is preferable for CD 202 to access net broadcast services using its care-of address and re-join nets when its care-of address changes.

Group Communication Application

The group communication application is based on two distinct application-level protocols: the Session Initiation Protocol (SIP) and net broadcast Media Signaling. SIP is used for call signaling and call setup. Media signaling carries PTT requests, resolves PTT arbitration conflicts, and manages net dormancy.

SIP Call Signaling

Figure 7:
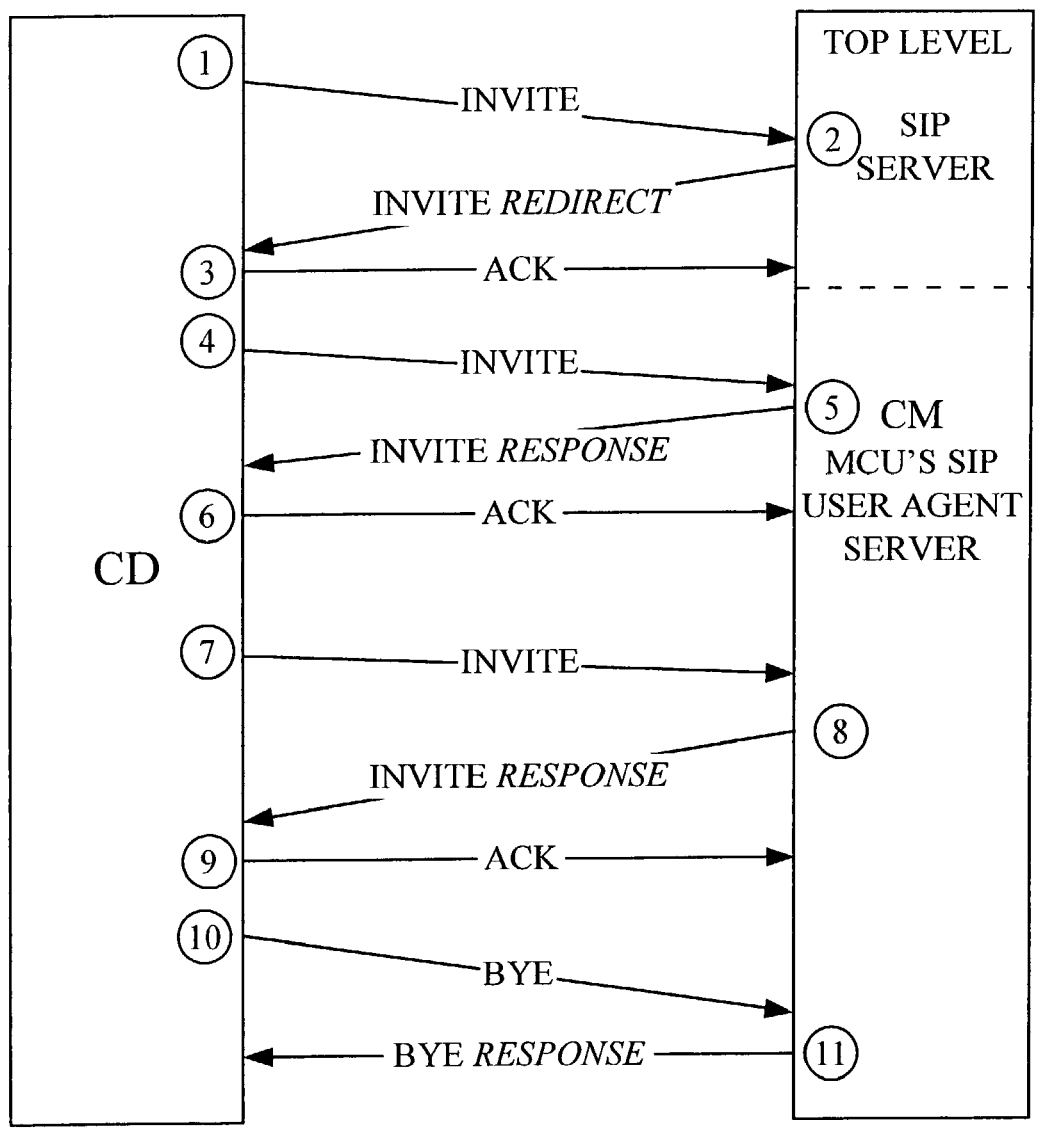
FIG. 7 illustrates an interaction between the communication device of FIG. 4 and the communications manager of FIG. 6 when the communication device of FIG. 4 attempts to join a net.

The Session Initiation Protocol, as defined in RFC 2543, provides the group communication system application-layer control (signaling) for discovering, joining, and leaving nets using a SIP server interface on CM 218. To join a net, CD 202 invites the net, by name, to participate in a call, through the top-level SIP server. To leave a net, CD 202 sends a corresponding "good-bye" to the net. A normal anticipated sequence of SIP call signaling messages exchanged between a CD and CM 218 is shown in FIG. 7.

CD 202 determines the IP address of the top-level SIP server by using DNS to resolve the provisioned primary or secondary SIP server addresses into Internet network addresses, if necessary. As an optional alternate approach, SIP conventions allow CD 202 to query for DNS service records associated with the system domain portion of the net address and contact the SIP server at the returned address(es).

Prior to attempting to join a net, CD 202 may place a call using the SIP INVITE method to request an updated list of available nets. For example, a CD denoted by a mobile identification number, or dial-number, MS6199726921 which has brought up an over-the-air connection using the IS 707.5 Packet Data Service option and has been assigned an IP address of 192.168.172.25, wishes to determine its current list of available nets by querying a top-level SIP server with a DNS address of sip.acme.com. As shown in FIG. 7 at time 1, CD 202 would open a UDP/IP connection to the SIP server port on sip.acme.com and issue a request similar to the following:

INVITE sip:nets@nbs.acme.com SIP/2.0
    Via SIP/2.0/UDP 192.168.172.25
    From: sip:MS6199726921@nbs.acme.com
    To: sip:nets@nbs.acme.com
    Location: sip: 192.168.172.25:5062
    Call-ID: 123@192.168.172.25.acme.com
    Case: 1 INVITE
    Content-Length: 0

The request to obtain an updated list of nets is addressed to a special destination, in this case, sip:nets@nbs.acme.com. When appropriate, CD 202 can also include additional application-specific headers identifying the network and system from which a cellular based CD is obtaining service. Sample headers containing this information are shown below:

X-CDMA-System: 0x7BCF
    X-CDMA-Network: 0xE289

CD 202 may also include a SIP Require header to indicate that CD 202 expects that the SIP server understands and supports group communication services. The option value distributed with the REQUIRE header can also be used by CD 202 to inform CM 218 of a specific version or type of group communication services which CD 202 expects CM 218 to support. A sample header is shown below:

Require: acme.bravo.nbs

As shown in FIG. 7 at time 2, CM 218's top-level SIP server may redirect the request, using SIP redirection mechanisms, to a destination specifically defined to receive and respond to requests for net information. Upon receiving such a redirection, CD 202 will ACK the response at time 3, and re-send the INVITE request to the redirected destination, as shown at time 4. A sample SIP redirection response is given below:

SIP/2.0 302 Moved temporarily
    From: sip:MS6199726921@nbs.acme.com
    To: sip:nets@nbs.acme.com
    Call-ID: 123@192.168.172.25.acme.com
    Contact: sip:nets@nbs.acme.com
    CSeq: 1 INVITE In the example above, CD 202 would need to determine the appropriate SIP contact point for the redirected address, sip: nbs@nets.acme.com, through DNS mechanisms (as previously discussed). To simplify this process for CD 202, CM 218 may specify the redirect destination explicitly using its Internet network address.

Once the INVITE requesting a list of nets is successfully received and accepted by CM 218, CM 218 should deliver an INVITE request response at time 5, similar to the following:

SIP/2.0 200 OK
    From: sip:MS6199726921@nbs.acme.com
    To: sip:nets@nbs.acme.com
    Call-ID: 123@192.168.172.25.acme.com
    CSeq: 1 INVITE
    Content-Type: application/nbs
    Content-Length: 71
    G bravo@nbs.acme.com S 2 audio data
    G dc@nbs.acme.com C 1 audio
    G techapps@nbs.acme.com C 1 audio The INVITE request response generally should include in its content a list of records defining the set of nets which CD 202 may subsequently join. CM 218 queries its net database for nets which list the requesting CD as a defined member to form the response to the INVITE request.

Nets are identified within the content using an application defined record format which includes the formal net-address of the net. Nets may be listed in any order. In the example, the format of the sample content of the INVITE response is described by the Content-Type of application/x-acme-nbs-grouplist. One possible definition of this content is a series of records, one record per line, each of which adheres to the syntax:

<record-type>[<field> . . . <field>]

where the first character in each record defines the record-type and is followed by one or more field values, with the number of expected field values determined implicitly by the record-type. In the example, three group definition records are included (G), with each record containing a net-address as well as an indication of the number and type of media channels defined for each net. Other definitions of the content are possible.

CM 218 may be unable to successfully respond to CD 202 for a variety of reasons. In such circumstances, CM 218 will deliver an appropriate SIP status code in place of the INVITE response shown above. CD 202 should be prepared to accept and interpret such status codes, taking appropriate action (such as displaying an error message on CD 202 user interface display) in the case of any fatal errors. For example, a SIP server which does not recognize or support the qualcomm.bravo.nbs requirement could respond as follows:

SIP/2.0 420 Bad Extension
    Unsupported: acme.bravo.nbs

CM 218 may also preface a successful INVITE response with informational status responses indicating the progress of the registrations, such as:

SIP/2.0 100 Trying

CD 202 is generally capable of accepting and interpreting such informational status codes which preface successful registrations.

Invite (Joining a Net)

In one embodiment, CD 202 requests to join a net by issuing a SIP INVITE request to the net's managing CM, shown in FIG. 7 at time 7. If CD 202 does not have an open UDP/IP connection to the SIP server, it will open a new UDP/IP connection to the SIP server port.

For example, CD 202 might attempt to join the ACME net by issuing a SIP invitation similar to the following:

INVITE sip:acme@nbs.qualcomm.com SIP/2.0
Via SIP/2.0/TCP 192.168.172.25
From: <sip:MS6199726921 @nbs.qualcomm.com>
To: acme <sip:acme@nbs.qualcomm.com>
Subject: Join
Call-ID: 421b2-314159 @192.168.172.25.qualcomm.com
Content-Type: application/sdp
Cseq: 1 INVITE
Content-Length: 128
v=0
o=−3115132610 3201 IN IP4 192.168.172.25
s=acme
c=IN IP4 192.168.172.25
t=311532610 0
m=audio 5200 RTP/AVP 12
a=type:nbs As before, CD 202 should be prepared to be redirected by the top-level SIP server and reissue the INVITE request to the redirected destination. CM 218's top-level SIP server should redirect any incoming INVITE request as appropriate to the MCU currently associated with the net in question. CD 202 may be redirected more than once.

The INVITE request may include a description of the media sources which will originate with CD 202, assuming the invitation succeeds. If included, the description may be included as message content and described using standard SIP Content-Type and Content-Length field constructions.

In the example above, CD 202 is advertising it will source a single audio session formatted using the RTP/AVP PureVoice™ payload profile. The session description is delivered in a format compatible with the Session Description Protocol (SDP) defined by RFC 2327. After defining the SDP version (v), the session description includes a mandatory origin (o) description; in the example, a random session identifier, 3115132610 and session version, 3201, are chosen such that the combination of the session identifier, version, and network and address type, IN IP4, and address, 192.168.172.25, forms a globally unique identifier for the session. CD 202 may use any convenient mechanism for choosing the values for the session identifier and session version. Providing an estimate of the current time is one possible way of defining the session identifier.

Connection data (c) is specified by defining the network type, IN; address type, IP4; and connection address, 192.168.172.25. CD 202 uses the IP address with which it will label (or source) media traffic as the connection address. CD 202 uses the name portion of the net's net-address as the session name (s), in this case, acme.

CD 202 specifies the lifetime (t) of the session by providing its best estimate of the start or current time, 311532610, in Network Time Protocol (NTP) format, and indicates that the session is unbounded, 0.

The media format (m) description defines the media type, audio; source port, 5200; transport protocol, RTP/AVP; and payload format, 12, which CD 202 intends to use to transmit to the net. The RTP/AVP payload profile maps a payload type of 12 to represent audio encoded using the PureVoice™ vocoder, developed by the assignee of the system and method for providing group communication services.

Finally, the session description uses an attribute (a) type definition to indicate that CD 202 expects the session to be operated as a group communication. CM 218 should confirm that the invited To: address is indeed a valid net address before it grants the invitation.

To indicate a successful invitation, and specifically inform CD 202 that it has been added to the list of participants for the invited net, CM 218 delivers an INVITE response at time 8 similar to the following:

SIP/2.0 200 OK
Via SIP/2.0/UDP 192.168.172.25
From: <sip:MS6199726921@nbs.qualcomm.com>
To: acme <sip:acme@nbs.qualcomm.com>
Call-ID: 421b2-314159@192.168.172.25.qualcomm.com
CSeq: 1 INVITE
Content-Type: application/sdp
Content-Length: 179
v=0
o=−3115132612 74512 IN IP4 192.168.156.18
s=acme
a=type:nbs
c=IN IP4 192.168.156.18
m=audio 8422 RTP/AVP 12
m=control 8420 UDP/NBS The INVITE response references the previously received invitation, in one embodiment, by Caller-Id.

A successful INVITE response includes the primary session description for the invited net, which describes supported media traffic ports and formats using SDP syntax, which is a well-known syntax used in conjunction with SIP. The session description includes a connection (o) description which defines the network address to which all media signaling and traffic should be sent (in the example, 192.168.156.18). The net's media destination network address is not necessarily the same as the SIP user-agent server's network address resolved using DNS from the net's net-address.

The session description describes all media and destination media ports. In the example, three media channels are defined for the net. The first supports audio encoded using a payload of type 12 as defined in the RTP/AVP media profile (i.e. QUALCOMM PureVoice™). The second defines a generic data channel encoded using a dynamic payload type (in the example, payload type 100) using a format defined by a group communication-specific media profile. Presently, two group communication-specific media formats exist: X-NBS-GVRS, which describes audio encoded using the GLOBALSTAR™ Variable Rate Speech (GVRS) vocoder using the RTP payload format and X-NBS-MELP, which describes audio encoded using the MELP vocoder standard using the RTP payload format.

If a net has been configured to transport media purely within UDP (generally necessary to support infrastructure which does not implement CRTP), the SDP media announcement fields use a transport of UDP/NBS and dynamic payload types for all media. An encoding name of X-NBS-QCELP is used to describe audio encoded using the QUALCOMM PureVoice™ vocoder. Similarly, encoding names of X-NBS-GVRS and X-NBS-MELP respectively describe GVRS audio and MELP audio media channels encapsulated directly within UDP.

The media formats for audio used in the net's session description may conflict with the formats suggested by CD 202 in its initial INVITE request. CD 202 will use the media formats defined by the net's session description for all traffic it intends to broadcast to the net.

The third media channel describes the UDP encapsulated group communication-specific media signaling channel.

The session description typically also includes an SRC identifier assigned to CD 202 by the MCU for the purpose of identifying media signaling messages transmitted by CD 202 as part of its subsequent participation in the net. The value of this identifier should be unique among all active participants on a given net and should thus be generated dynamically.

The session description may also include a group communication protocol version announcement indicating the revision level to which the net's media signaling will adhere. Such an announcement could be implemented by extending the value of the type attribute field or defining a new attribute, e.g. gc-revision, whose value is the protocol version number.

ACK

In one embodiment, after receiving a successful INVITE response, CD 202 confirms the invitation by sending a SIP ACK request back to the net's MCU's SIP user-agent server, shown in FIG. 7 as time 9. After the sample exchange shown in FIG. 7, an ACK request similar to the following would be transmitted:

ACK sip:nbs.qualcomm.com;transport=tcp SIP/2.0
Via SIP/2.0/TCP 192.168.172.25
From: <sip:MS6199726921@nbs.qualcomm.com>
To: condor <sip:acme@nbs.qualcomm.com>
Call-ID: 421b2-314159@192.168.172.25.qualcomm.com
CSeq: 1 ACK After transmitting the ACK request, CD 202 may close its TCP connection with the SIP server. Prior to the ACK being transmitted, CD 202 should initialize its media signaling and traffic ports according to the session description delivered in CM 218's INVITE response.

Bye

In one embodiment, at any time after CD 202 has transmitted a SIP ACK message in response to a successful INVITE response, CD 202 may formally terminate its participation in the net by sending a SIP BYE message to the net's SIP user-agent server, shown in FIG. 7 as time 10. Prior to sending the BYE, CD 202 may need to open a TCP connection to CM 218.

In one embodiment, a BYE message transmitted by CD 202 adheres to the following form:

BYE sip:acmeC@nbs.qualcomm.com SIP/2.0
Via SIP/2.0/TCP 192.168.172.25
From: <sip:MS6199726921@nbs.qualcomm.com>
To: condor <sip:acme@nbs.qualcomm.com>
Call-ID: 421b2-314159@192.168.172.25.qualcomm.com
CSeq: 2 BYE Note that the BYE uses the same Call-ID but a new CSeq from the previous exchange of SIP messages.

The BYE is acknowledged by CM 218 with a BYE response, shown in FIG. 7 as time 11, and similar to:

SIP/2.0 200 OK
Via SIP/2.0/TCP nbs.qualcomm.com
From: <sip:MS6199726921@nbs.qualcomm.com>
To: condor <sip:acme@nbs.qualcomm.com>
Call-ID: 421b2-314159@192.168.172.25.qualcomm.com
CSeq: 2 BYE Once the BYE is acknowledged, CD 202 may close its UDP connection with CM 218. Prior to acknowledging the BYE, CM 218 will remove CD 202 from the indicated net's list of active participants.

Options

In general, CD 202 may use the OPTIONS method to query a SIP server's capabilities. In particular, CD 202 might wish to query an arbitrary SIP destination to determine whether the destination provides NBS call signaling support.

Cancel

CD 202 may wish to abort a pending INVITE request prior to receiving the INVITE response and sending the acknowledgement. In such circumstances, CD 202 may use the SIP CANCEL method to gracefully abort the call. Both CM 218's top-level SIP redirect server and SIP user-agent server should support the CANCEL method.

For example, CD 202 may use the CANCEL method to abort an INVITE in progress if the user decides to place a voice-services call and presses send before the INVITE completes. In such a circumstance, rather than wait for the INVITE to complete and immediately send a BYE, CD 202 may simply immediately CANCEL the INVITE and proceed to place the requested voice-services call.

Group Communication Media Signaling

After CD 202 has successfully negotiated entry into the current membership of a net using SIP, real-time call control takes place through point-to-point application level media signaling messages exchanged between each CD and the net's MCU. The following group communication media signaling message types are defined in accordance with one embodiment.

PTT

A push-to-talk (PTT) request message is sent by CD 202 to CM 218 and signals a user's desire to broadcast media, typically voice, to the net. Normally, a PTT request message is sent each time PTT switch 450 is activated on CD 202. In addition, a PTT release message is sent by CD 202 to CM 218 to denote a release of PTT switch 450.

The PTT message comprises a number of fields containing various information used to grant or release the transmission privilege. In one embodiment, a first field is used to designate whether the PTT message is a request for the talker privilege or a release of the talker privilege. A second field is used to identify which CD has sent the PTT message. A third field is used to provide a unique message identifier to allow subsequent PTT release and PTX messages (defined later) to reference a specific PTT request. The identifier should be unique within the registration session of a particular CD.

In one embodiment, CD 202 expects to receive at least one PTX response message for every transmitted PTT request. If a PTX response is not received within a predetermined time, CD 202 assumes the PTT was lost in transit and retransmits a second PTT message using the same PTT message identifier in the third field. The predetermined time can be for a fixed time duration or it can be altered dynamically, depending on system conditions. For example, the predetermined time could have a relatively short duration (one to two seconds) if the net is not dormant. In this case, CM 218 should be able to respond relatively quickly to the PTT message. If the net has entered dormant mode, the timeout should be extended to accommodate the additional time required to return the active state.

In one embodiment, if a PTX response message is not received from CM 218 within a reasonable number of retransmits, CD 202 assumes that CM 218 is no longer reachable, transitions to the idle state, and indicates an error condition to the user.

PTX

A PTX message is sent by CM 218 to a first CD 202 to acknowledge and respond to a previous PTT request from the first CD 202, as well as to signal various arbitration events. CM 218 uses the PTX message to respond to a PTT message, including both requests and releases. The PTX message includes information as to whether the referenced PTT request message was granted or denied. When responding to a PTT release message, the PTX message is used to indicate confirmation of receipt. CM 218 may also use the PTX message to deny a previously granted PTT request message (if a higher priority CD issues a PTT request message, the transmission privilege expires (i.e. times out), or some other event occurs requiring that the transmission privilege be revoked).

In one embodiment, the PTX message comprises several fields used to convey information to a PTT message. A first field is defined which indicates whether the PTX message is a synchronous response to an outstanding PTT request, or if it is an asynchronous message indicating an error or priority arbitration conflict. A second field references a previously received PTT request. A third field indicates whether the PTX message is granting, denying, revoking, or confirming the transmission privilege. A fourth field provides additional information explaining the PTX action, particularly in cases when the PTX message denies, revokes, or cannot act upon a prior PTT request. This field may indicate that a higher priority talker has been granted the transmission privilege, or that CD 202 is not listed as a net participant and hence is not allowed to submit media signaling requests for the net. A fifth field represents the maximum time duration for which the transmission privilege is valid. CM 218 starts a timer from when the PTX message is transmitted. In another embodiment, the timer is initiated when CD 202 begins sending media traffic. The value of this field may be a fixed parameter, or it may be variable, depending on various parameters, such as the amount of net traffic, the number of active net users, etc.

CD 202 may or may not acknowledge receipt of the PTX message. If the transmitted PTX message response is lost, a CD 202 PTT retransmit timer will expire and CD 202 may retransmit its PTT request.

PTA

A PTA message is sent by CM 218 to each CD currently participating in a net to announce the identity of the source of pending media traffic. A PTA message is also used to formally announce a release of the transmission privilege. The PTA message comprises a field that indicates whether the PTA message is announcing the granting (or denying) of the transmission privilege. In addition, other indications are possible within this field, such as revoking or confirming the transmission privilege. A second field identifies the particular CD 202 which will source media traffic to the net until the next PTA message is sent.

CD 202, whose PTT floor-control request was successful, may or may not receive a PTA message announcing it has been granted the talker privilege. The message may arrive before or after it receives the corresponding PTX response, since some data protocols, such as UDP, do not necessarily preserve datagram ordering. Accordingly, the requesting CD may choose to ignore any received PTA messages which announce it has been granted the talker privilege and rely only on receipt of a PTX grant message response to determine whether it can begin transmitting media to the net.

In one embodiment, PTA announcement messages are not acknowledged. Lost PTA messages are neither detected nor retransmitted. A CD which does not receive a PTA announcement may be unable to display the talker identity of the subsequent talker. However, in another embodiment using RTP encapsulated media, a source destination field is used which uniquely identifies the sender. A CD may cache the mapping between prior PTA announcements and media streams and make use of this information to identify RTP encapsulated media streams using the source destination field if a corresponding PTA announcement message for a particular talk period is not received.

AYT

CM 218 occasionally will poll an individual CD in a net to confirm that the CD in question is able to be contacted using data protocols. The polling message is known as an "Are You There?", or AYT message. Multiple AYT messages may also be sent to a group of net participants, for example, in order to alert the net participants that a net is no longer in dormant mode.

An AYT may be sent to determine whether CD 202 is still able to be contacted via data protocols or if CM 218 desires to bring the net's associated cellular traffic channels out of dormant mode. An AYT message may comprise a unique message identifier to allow a subsequent IAH response message (defined below) to reference a specific AYT request message. The unique message identifier may include a timestamp reference for generating latency estimates. Note that AYT messages are not necessarily broadcast to each CD at the same time. CM 218 may stagger sending AYT messages to each net participant to avoid receiving a flood of simultaneous IAH message responses.

CD 202 may or may not be in dormant mode when an AYT message is sent. Generally, CD 202 responds to a received AYT message with an IAH response message. In one embodiment, if an IAH response is not received by CM 218 within a reasonable timeout, CM 218 transmits a new AYT message with a new unique message identifier. If, after a configurable number of retransmits, a response to the AYT is not received from CD 202, CD 202 is assumed to be unreachable and CM 218 removes it from the current list of net participants. Future media signaling messages from the removed CD will be ignored (or will generate an error response) until CD 202 successfully rejoins the net as described above. In another embodiment, CD 202 does not need to re-join the net.

IAH

CD 202 acknowledges an AYT message with a response known as the "I Am Here" response, or IAH. In one embodiment, an IAH message comprises an identification field which specifies which previously-received AYT message the CD 202 is acknowledging. An IAH message also comprises information which uniquely identifies the CD 202 sending the IAH message.

CM 218 assumes that CD 202 will acknowledge any received AYT messages with an IAH response message. If the referenced AYT message was sent to confirm that a CD remains connected in a quiet state, i.e., passively monitoring net media traffic and signaling, CM 218 notes the time of the IAH receipt for future reference.

ZZZ

If CM 218 notices that no net activity in the net, or in another embodiment, with individual net members, has occurred for a predetermined time, it will send a "Sleep" message, or ZZZ message, to one or more CDs to encourage them to release an associated over-the-air resource and enter the dormant state. Each CD may choose to ignore this message, for instance when it is concurrently supporting other packet applications. In one embodiment, a sleep message comprises an identification code corresponding to the CM 218 sending the sleep message for CDs to differentiate between multiple receipts of the sleep message.

In one embodiment, CD 202 does not acknowledge receipt of the sleep message and no error recovery is attempted if the sleep message is lost. To guard against a sleep message being lost, CM 218 may send multiple copies of the same sleep message to an individual CD or to an entire net. CM 218 will ensure that all copies of the same sleep message are sent within a defined interval, and CD 202 should wait for a period longer than this interval from the time the first sleep message is received before releasing its over-the-air link and transitioning to the dormant state.

ASK

Occassionally, CD 202 will send a message to CM 218 to confirm connectivity with CM 218 as well as to allow CD 202 to determine whether CD 202 remains listed as a net participant. This message is known as an "ASK" message. CD 202 may wish to confirm its participation after a service-disruption or other period where it may have temporarily lost connectivity with CM 218. In one embodiment, the ASK message comprises a unique message identifier to allow a subsequent FYI response message (described below) to reference a specific ASK request message. The ASK message futher comprises an identification code which uniquely identifies the particular CD 202 sending the ASK message to CM 218.

CD 202 assumes that CM 218 will respond to a received ASK message with an FYI response message. If an FYI response is not received within a reasonable timeout, CD 202 transmits a new ASK message with a new unique message identifier. If, after a configurable number of retransmits, a response to the ASK is not received from CM 218, CM 218 is assumed to be unreachable and CD 202 transitions to the idle state.

FYI

In response to an ASK message from CD 202, CM 218 sends a message to CD 202 to acknowledge receipt of a previously sent ASK message or the ASK message is sent by CM 218 to inform CD 202 of an exceptional condition. This message is known as an "FYI" message. In one embodiment, the FYI message comprises a field which defines whether the FYI message is a response to an outstanding ASK request, or if it is a message indicating an exceptional condition. The FYI further comprises a field which indicates whether the FYI message is confirming net participation, informing CD 202 that it has been administratively deleted from the net's member list, or performing some other predefined function. Furthermore, the FYI message comprises a status field which provides additional information explaining the FYI action, particularly in cases when the FYI message indicates that CD 202 is not a net participant or member. The FYI message may further comprise an identification field which references a previously received ASK message that CD 202 is acknowledging.

In one embodiment, CD 202 does not acknowledge receipt of FYI message responses. If a FYI message response is lost, CD 202 will send a new ASK message request after a predetermined time period has elapsed since sending the previous ASK message.

Media Signaling Message Sequence

Figure 8:
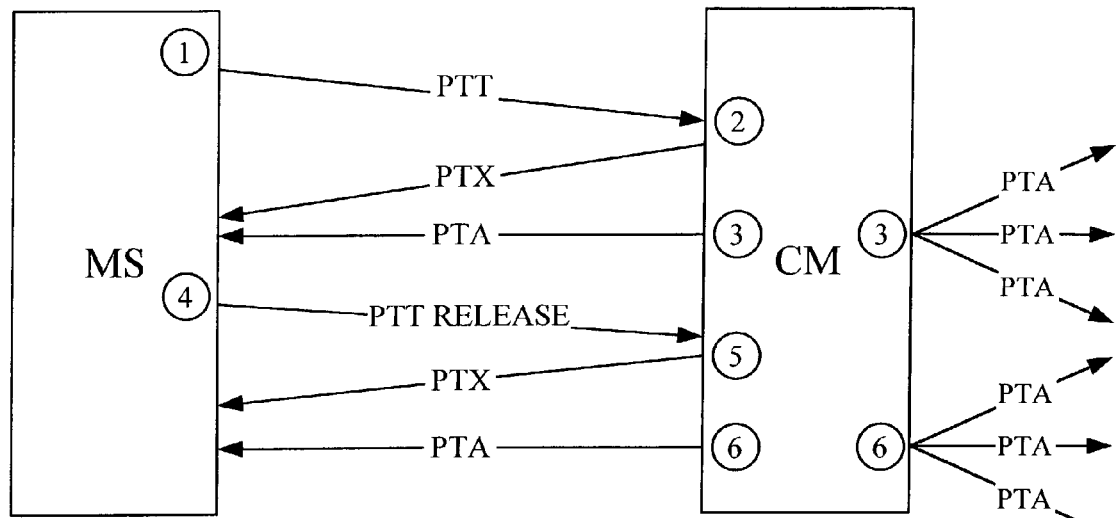
FIG. 8 illustrates an interaction between the communication device of FIG. 4 and the communications manager of FIG. 6 when a push-to-talk switch located on the communication device of FIG. 4 is operated.

FIG. 8 depicts a sequence of group communication media signaling messages exchanged between a single CD 202 and a net's managing MCU. Messages are transmitted in the order shown.

At time 1, an active CD 202 sends a PTT request to CM 218, indicating a user's desire to broadcast media to the net by issuing a PTT message request. In response to the PTT request, at time 2, CM 218 responds with a PTX message response to the requesting CD 202 which may either grant or deny the request. If the request is granted, a PTA announcement message is sent to the net participants at time 3. In addition, a second PTX message response may be sent later if the user continues to broadcast beyond the net's PTT timeout or if a higher priority user issues a PIT request while CD 202 is broadcasting.

Figure 9:
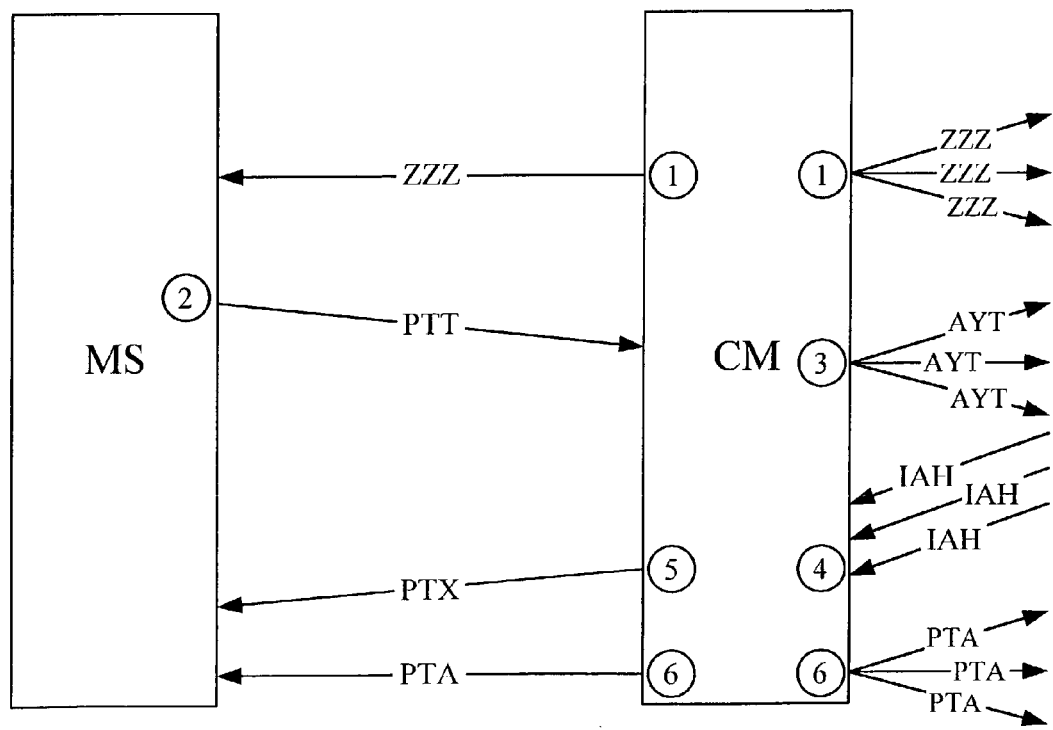
FIG. 9 illustrates an interaction between the communication device of FIG. 4 and the communications manager of FIG. 6 to establish and exit a dormancy period.

CD 202 normally broadcasts media traffic until the user releases PTT switch 450, at which point it signals the end of the talk period by issuing a PTT release message to CM 218, shown in FIG. 9 at time 4. CM 218 responds with a PTX confirmation message at time 5 and broadcasts an announcement signifying the end of the talk period to the net participants at time 6.

Dormancy

During periods of extended net inactivity, one embodiment of the system and method for providing group communication services allows for a data service call to be placed in the dormant state. CM 218 facilitates transitions into and out of the dormant state by independently managing a similar dormancy concept for each net.

CM 218 maintains a first timer, called the inactivity timer 614, for measuring a net's hang-time, defined as a time period in which no member of a net is transmitting information to the other net members. When inactivity timer 614 reaches a configurable, predetermined value, it triggers CM 218 to place a net in a dormant state by broadcasting a sleep media signaling message to the net participants. In another embodiment, an individual inactivity timer 614 is maintained for each member of a net, and after a configurable, predetermined time period, the inactivity timer triggers CM 218 to place each member into the dormant state, one by one, by sending a sleep message to members as their individual inactivity timers expire.

Upon receipt of the sleep message, an active CD may release its traffic channel and enter the dormant state, in accordance with the particular data transmission protocol in use, such as IS-707.5 in a CDMA communication system. Alternatively, CD may ignore the sleep message and remain in a connected state. Net participants which are not operating over a data channel capable of releasing the channel, such as dial-up PSTN users, should ignore sleep media signaling messages.

In one embodiment, inactivity timer 614 is reset to zero when a PTX message is transmitted and remains at zero until the transmission privilege expires or CD 202 releases the transmission privilege. Once the transmission privilege is released, inactivity timer 614 advances until the next PTX message is transmitted.

Wake-Up Time

If a participating CD enters the dormant state, it will generally remain dormant until either data addressed to CD 202 arrives at the cellular infrastructure for wireless transmission to CD 202, or CD 202 generates data to be sent. The former case may be triggered by traffic sent to CD 202 by CM 218. The latter case may be triggered by the user keying PTT switch 450 to request permission to broadcast to the net. Other triggers unrelated to group communications are also possible.

The net itself will remain dormant until one or more members trigger the transmission of a PTT request. If CM 218 determines it can grant the PTT request message (i.e., the PTX message) (including performing any necessary arbitration to deal with multiple requests) it will send an AYT request to each listed net participant to trigger a transition out of the dormant state. For any specific CD, the trigger may or may not be necessary, (i.e. not necessary to a requesting CD), but, in one embodiment, each CD responds to the AYT as described above.

In one embodiment, when a net is transitioning out of the dormant state, CM 218 will refrain from sending an initial PTX message until a configurable second timer, called the PTX Dormancy response timer 616, expires. After this timer expires, CM 218 will send a PTX grant message as usual. However, CM 218 will refrain from forwarding media to the net until a third timer, called the net's wake-up timer 618, expires. Any media received from a transmitting CD during this time will be stored in a buffer 622 within CM 218. In one embodiment, both timers reset when CM 218 determines that the transmission privilege can be granted. In another embodiment, wake-up timer 618 is reset when the PTX grant is transmitted. In yet another embodiment, wake-up timer 618 is reset when media is received by CM 218 after the PTX grant has been transmitted. The value of wake-up timer 618 is generally greater than the value of PTX dormancy response timer 616. After wake-up timer 618 has expired, CM 218 begins forwarding media and media signaling from buffer 622, if any media has been received during the wake-up time period. Both timers are generally configurable on a per net basis.

In one embodiment, rather than rely on wake-up timer 618 to determine when to begin transmitting buffered media stored in buffer 622, a configurable threshold number of responses to the AYT messages are used to determine when enough net members are present to begin transmitting media traffic from buffer 622. For example, in a net having 10 active (registered) members, the threshold number of responses may be equal to 7, meaning that as soon as 7 IAH responses to the 9 AYT messages (an AYT is not sent to the member requesting the transmission privilege) are received, any media stored within buffer 622 will be transmitted to the 7 members.

If CM 218 determines that it cannot grant a PTT request while the net is dormant, it signals the requesting CD accordingly and the net remains dormant.

Late Risers

A CD which has entered the dormant state may require a system change, change service options, or experience some other service disruption which causes it to not receive and respond to an AYT message. CM 218 maintains a fourth timer, known as the "late-riser" timer 620, which also resets with the wake-up and PTX dormancy response timers. This late-riser timer is generally also configurable on a per net basis. After late-riser timer 620 expires, a CD whose IAH response to the AYT wake-up message has not been received is removed from the net's list of active participants by CM 218. In one embodiment, any such removed CD is required to reregister with CM 218's SIP server in order to once again become a net participant.

Voice Buffering

Due to the delays associated in transitioning a CD out of the dormant state to the connected state, CD 202 and/or CM 218 may perform voice buffering to mitigate the transition delay perceived by the user.

Normally, a CD 202 user-interface will signal to the user, through visual or audio mechanisms, two milestones in the processing of a PTT request. First, CD 202 signals that it has detected a PTT key-press. Later, CD 202 signals that it has received CM 218's PTX message response. If the PTX message response grants permission to broadcast media, the CD 202 user-interface provides an indication that the user can begin talking to the net. Otherwise, the CD 202 user-interface indicates that the user has been denied permission to talk to the net. When the net is not dormant, the latency between the transmission of the PTT request message and receipt of the corresponding PTX response message is small, and the user will grow accustomed to being granted permission to speak shortly after the PTT button is keyed.

However, when the net is dormant, a significant delay may separate transmission of the PTT request and receipt of the corresponding PTX, due to the fact that CD 202 may have released its traffic channel and will experience a delay in re-establishing data services (for example, the re-establishment of over-the-air resources). Also adding to the delay is that the other dormant net members must re-establish traffic channels after CM 218 receives a PTT request. Accordingly, in order to allow the user to begin speaking with minimal delay after sending a PTT request, a simulated transmission privilege grant is generated by CD 202, using well-known techniques, and provided to the user, generally by audio means. The simulated transmission privilege is similar to an actual transmission privilege grant, so that the user generally cannot distinguish between the two. The simulated transmission grant allows the user to begin speaking almost immediately after a PTT request is generated. CD 202 is capable of buffering the user's voice in an internal media buffer until either an actual transmission privilege grant is received, or until the available space in the internal memory is consumed.

If the PTX message response arrives granting talker privileges, CD 202 may begin transmitting the buffered voice and operation proceeds normally, albeit with a slightly longer end-to-end latency between net users during the present talk-period.

If the PTX message response arrives denying the PTT request, CD 202 will signal the user that permission to talk to the net has been denied. At this time, any voice information stored in the internal media buffer may be erased.

If the talker privilege is granted, but the PTX message does not arrive before all available internal memory space is consumed, CD 202 may simulate a PTX denial and signal the user to stop talking. If CD 202 has not been able to re-establish service, it may also need to take other error action at this point and inform the user accordingly. Alternatively, if by this time a data services connection has been re-established, CD 202 may, in this situation, begin transmitting voice media to CM 218 without prior receipt of a PTX message.

While waiting for the wake-up timer to expire, CM 218 may be capable of buffering any media received on a net's media channels from a CD 202 which has been sent a PTX grant of the transmission privilege. The received media is stored in buffer 622 within CM 218. Once the wake-up timer expires, CM 218 transmits a PTA announcement to the net, and begins broadcasting the buffered media stored in buffer 622. If CM 218's buffer 622 is consumed before the wake-up timer expires, CM 218 transmits a PTX denial to the requesting CD. The buffered media stored in buffer 622 may be transmitted to the net after the wake-up timer has expired. Once the wake-up timer has expired, net operation proceeds normally.

During the transmission of any buffered media from buffer 622, CM 218 will treat the net as active, even if the talking CD has released the talker privilege. Hence, CM 218 will generally not allow a CD to interrupt the transmission of buffered media unless the interrupting CD has higher priority than the source of the buffered media.

The size of the internal media buffer in CD 202 may be chosen based on the maximum time expected to transition to the connected state from the idle state. Similarly, the size of buffer 622 in CM 218 should be chosen based on the (maximum) value of the net's wake-up timer specified in CM 218's net database.

Interaction with Point-to-Point Calls

While a CD has entered the dormant state, CD 202 may receive point-to-point voice services calls via a voice or another data service option, yet remain a participant of one or more dormant nets. After the point-to-point or other data service call is terminated, CD 202 will generally return to the dormant state.

However, if the net comes out of dormant mode while a CD has chosen to receive a point-to-point voice service option call or another data services call, CD 202 will likely miss an AYT "wake-up" message request and hence be removed from the net's list of active participants. In such instances, CD 202 may determine its participant status by sending CM 218 an ASK request after terminating the point-to-point call.

In general, once a CD has been removed from a net's list of active participants, it is required to re-register with CM 218's SIP server in order to once again participate in the net.

Under normal circumstances, a CD which has negotiated itself into the dormant state can expect a base station to maintain the state associated with the dormant data call for up to 24 hours before it will drop the call. However, when base station resources are at a premium, some base stations are permitted to drop the call after only 10 minutes of dormancy—and to do so without explicitly notifying CD 202. Such behavior by the base station can directly result in the user unknowingly missing significant or important portions of a net's media traffic, as CD 202 will remain in dormant mode until it (or the user) takes action, such as keying PTT switch 450. Hence, in such situations, CD 202 will only discover that the data call was dropped after it attempts to bring the call out of dormancy. As a result, CD 202 cannot assume that a base station will re-connect a data call in the dormant state when net activity resumes if the data call has been dormant for more than the maximum allowed dormancy time, in the present example, 10 minutes.

In most cases, CD 202 cannot prevent the base station from dropping a dormant data call. However, CD 202 can confirm that a dormant call has not been dropped by periodically transitioning to the connected state, and forcing some over-the-air data activity to occur. Using this method, CD 202 can quickly learn if and when a call was dropped by the base station. In one embodiment, a short series of ICMP/IP echo requests (i.e., a set of pings) are sent to the base station, awaiting a reply. Alternately, CD 202 may transmit an ASK media signaling request to CM 218 and await the expected FYI response. In either case, if the transition to the connected state succeeds, CD 202 has confirmed that the call remains valid and it can return to the dormant state. The latter approach also allows CD 202 to confirm that CM 218 continues to consider it a member of the selected net.

Performing this check allows CD 202 to ensure that it can detect when and if a dormant data call is dropped by the base station within a reasonable time of the drop occurring. Because the base station will generally not drop a data call which has been dormant for a period of less than 10 minutes, CD 202 will generally not perform this check until at least 10 minutes has expired since CD 202 last transitioned to the dormant state. The time for sending such a check may be a fixed, predetermined value, or it may be configured by a user through the user-interface.

Dormancy Signaling

FIG. 9 depicts a sequence of group communication media signaling messages exchanged between a single CD 202 and a net's managing MCU to illustrate dormancy. Messages are transmitted in the order shown.

After the net has been idle long enough for the net's configurable hang-time to expire, CM 218 broadcasts a sleep request message to the net's participants, as shown in step 1. In response, each CD may release its over-the-air resources and enter the dormant mode, by releasing its air interface resources. Generally, this means that MSC 118 and base station(s) 216 discontinue the communication channel associated with a dormant CD, while maintaining various settings to allow a relatively quick re-connection to the communication channel. Note that, in one embodiment, the net participants do not respond to the sleep request message.

A successful PTT request by a CD will bring the net out of dormant mode, shown in FIG. 9 as time 2. (It should be understood that other events may bring a net out of dormancy. For example, a net administrator may need to contact one or more net members by sending a message to CM 218 for transmission to the one or more intended net members. CM 218 may provide an independent method of bringing a net out of dormancy. For example, if no PTT requests are received after a significant time period has elapsed, CM 218 may autonomously send an AYT message to the net participants to see which CDs are still responding to messages. Other possibilities of bringing a net out of dormancy are also possible.)

Prior to granting the PTT request with a PTX message at time 5, CM 218 will send an AYT message request to the other members of the requesting CD's net (time 3), forcing each previously participating CD out of dormancy if over-the-air resources were released in response to the sleep message, and to confirm that the CDs are still able to be contacted via data protocols. At time 5, after a configurable time period, defined herein as the PTX dormancy response time, CM 218 transmits a PTX message, granting the transmission privilege to the requesting CD. The PTX dormancy response time gives CDs an opportunity to re-establish a communication channel and send an IAH message (time 4), alerting CM 218 that they are still able to be contacted. This allows CDs to receive communications from the PTT requestor once the PTX grant has been issued.

Once the PTX grant has been received by the requesting CD, it may begin transmitting media to CM 218. CM 218 may refrain from forwarding media to the other net members until a wake-up timer 618 expires. This is done by CM 218 storing the media in a buffer 622 within CM 218, or in an internal media buffer inside CD 202. The value of the wake-up timer is generally greater than the value of the PTX dormancy response timer. After wake-up timer 618 has expired, CM 218 begins forwarding media and media signaling from the buffer 622, or the internal media buffer, if information has been stored during the wake-up time period. If no information was transmitted during this time, any media received from the CD holding the transmission privilege is forwarded directly to the other net members.

Ideally, the PTX dormancy response timer is set to zero, so that a quick reply can be made in response to the PTT request. The wake-up timer allows CDs time to re-establish a communication channel while the PTT requestor is transmitting media to CM 218. After the wake-up timer expires, CM 218 announces the talker by issuing a PTA message at time 6 to the net participants and any media stored within the buffer may be forwarded to the other net members. If no buffering has taken place prior to the expiration of the wake-up timer, media is forwarded to the other net members as it is received by CM 218 from the talker.

Note that CM 218 may receive IAH message responses for an extended interval after the net is brought out of dormant mode and that CM 218 may not wait for all net participants to respond before granting the pending PTT request. Late responders whose IAH response arrives after the PTX message response is transmitted will remain listed as net participants, but may not receive all initial media traffic and signaling. Any CD which does not respond to the AYT request after a configurable time period is assumed to no longer be reachable and is removed from the net's list of active participants.

PTT Arbitration Signaling

Figure 10:
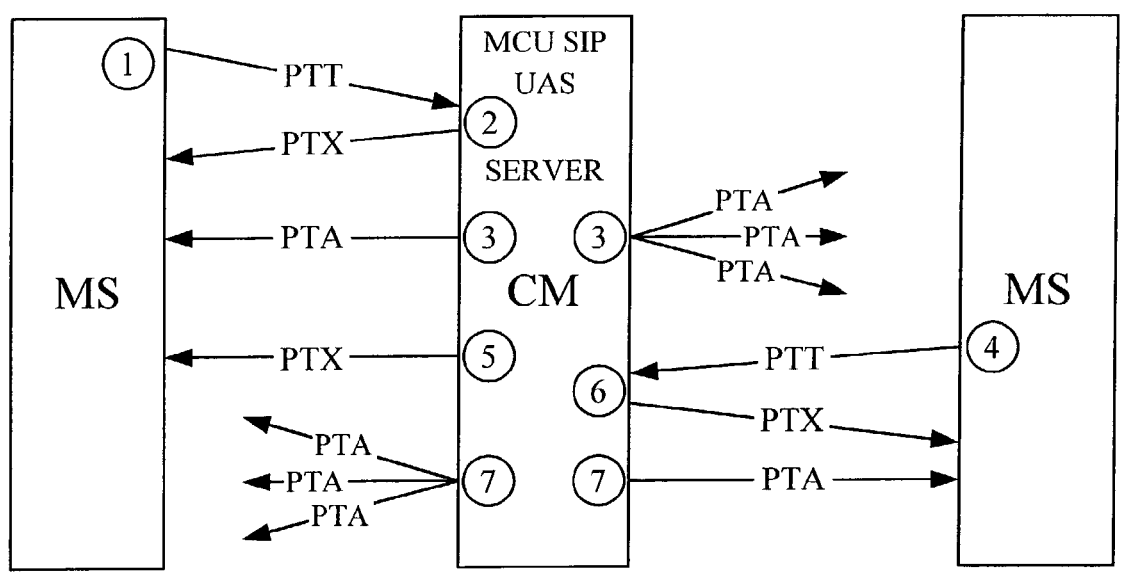
FIG. 10 illustrates an interaction between a first communication device, a second communication device, and the communications manager of FIG. 6 during a revocation of a talker privilege.

FIG. 10 depicts a sequence of group communication media signaling messages demonstrating a higher priority CD interrupting a lower priority CD having the talker privilege.

At time 1, a lower priority CD submits a PTT message request to CM 218 which is granted by CM 218 at time 2. CM 218 announces that CD 202 has the talker privilege by issuing a PTA message to net members at time 3.

While the lower priority CD is transmitting media, a second CD attempts to interrupt by sending CM 218 a PTT message request at time 4 for the same net. CM 218 determines that the second CD has higher priority than the talking CD and consequently revokes the talker privilege from the talking CD by sending it a PTX revocation message at time 5. CM 218 then grants the PTT request to the higher priority CD with a normal PTX message response at time 6 and announces that the higher priority CD has the talker privilege by sending a PTA message to net members at time 7.

If CM 218 determines that the interrupting CD does not have higher priority than the first CD, CM 218 rejects the PTT request with a PTX message response and continues to distribute media from the talking CD to the net's participants.

Although the priority assigned to a particular CD is typically a fixed value defined in a database maintained by CM 218, CM 218 may use other arbitration algorithms which do not necessarily always grant the talker privilege to the highest-priority requesting participant, as depicted here. The PTT arbitration algorithm used to arbitrate conflicts can be individually configured on a per net basis.

CD User Addressing

Both SIP call signaling and PGP public key encryption require the existence of a unique user-id or similar identifier to uniquely identify CD 202. CM 218 user database defines an internal user identifier (which may be forwarded to and used by CD 202 in media signaling requests), but this user identifier may not necessarily be appropriate as a unique CD user address. CD 202 user-id address should also not contain any secrets or private data whose public disclosure might compromise existing cellular infrastructure authentication mechanisms.

As long as CD 202 user address satisfies these basic constraints, many reasonable definitions are acceptable. Assuming every CD is also assigned a unique dial-number, one possible definition could be based on the syntax MS<DN>@nbs.<service-provider-domain> where <DN> denotes CD 202 dial-number and <service-provider-domain> is the fully qualified domain name associated with a service-provider's IP network. Using this definition, MS6199726921@nbs.qualcomm.com could be assigned as the user address for a CD with dial-number 619-972-6921. Note that this form also allows a CD to be assigned multiple unique user addresses, on a per service-provider basis.

A more general CD user-address might assume the following form:

<username>@<domain> where <username> is a user-definable string unique within a specific <domain> and <domain> is an arbitrary Internet DNS domain. For example, alice.smith@users.wirelessknowledge.com could be CD 202 user-address of a user, Alice Smith.

CD 202 user address is used in the FROM headers in SIP registration and invitation, and may be used to form other parts of the required SIP syntax. The user address may also be used as an input to the generation of a private PGP key used to authenticate SIP requests.

CD 202 user-interface may allow the user to view and/or modify the user address.

CD Authentication

To guard against certain denial of service attacks and prevent CD masquerading, CM 218 will optionally require that CD 202 authenticate itself prior to registering or joining a net. Authorization may be performed at the application level, independent of other authorization schemes that may exist at the network or cellular infrastructure level. In one embodiment, CD authorization is also implemented, and operates, independently of concepts and data structures supporting encrypted (secure) nets.

In particular, CM 218 may require that CD 202 include an AUTHORIZATION header with SIP requests. The AUTHORIZATION header allows for a SIP message to be signed by CD 202 using PGP public key cryptography signatures.

Public key cryptography generates a public and private key from a private secret known only to the encryptor, in this case, CD 202. The private key, in combination with the secret, is required to sign a message, but the public key alone can be used to verify a signed message's signature. Hence, to support SIP authorization, each CD may be provisioned with a private secret and private key, which are normally never shared. Each CM 218 to which a CD may need to authorize itself is generally required to know the public key of CD 202. Since the public key is not secret, it can be stored as part of the user database maintained by CM 218, or accessed through generic public key servers on the Internet.

CM 218 may require CD authorization at the server, net, or user level. At the server level, CM 218 will require CDs connecting to CM 218's SIP server to provide authorization credentials, rejecting requests which are not authorized. When server level authorization is enabled, only CDs whose identities (i.e., a CD's public key) are previously known to CM 218 can effectively use the server. Server level authorization can protect CM 218 SIP's server from many relatively easy denial-of-service attacks.

CM 218 may protect one or more nets which it manages through authorization, but leave other nets unprotected. If a CD attempts to INVITE itself to a protected net, CM 218's SIP server will generally reject the request unless CD 202 can be authorized by CM 218.

Finally, CM 218 may use authorization to ensure that a CD (or any SIP user-agent client in general) does not attempt to masquerade as another CD and hence either deny service to legitimate net participants or passively monitor a net's media channels. If CM 218 requires that a specific CD be authorized, CM 218 will generally not accept SIP requests from a client connecting as CD 202 unless the client's SIP requests include further authentication, such as a PGP signature which can be verified by CM 218. Authentication can be configured on a per user basis. In this case, CM 218 may require that certain users be authenticated prior to joining a net while allowing other users to join without being unauthenticated.

The PGP private key may either be administratively provisioned within or created by CD 202, once CD 202 user address has been defined. The private key need not be stored externally, but the associated public key may be loadable into the user database of any SIP server requiring CD authentication.

Multiple Group Communication Systems

The above description assumes that in at least one embodiment, the system and method for providing group communication services is deployed as an isolated service, with one CM 218 operating completely independently within a specific geographic region or area of service. However, it should be understood that the at least one embodiment of the system and method for providing group communication services is also capable of extending group communication services beyond that of the local geographical area. This is accomplished by deploying CMs in multiple communication networks, including GSM, TDMA, and CDMA cellular networks, in satellite communication systems, such as GLOBALSTAR™ and IRIDIUM™, and corporate intranets using local area networks or wide area networks.

Communication between CMs of different systems takes place using SIP server redirects, the exchange of user database and net database records, and additional messages between CMs to facilitate an integrated NBS service.

In an integrated group communication service, it may be preferable to allow any CM to assume ownership of a net, and hence, not tightly bind the operation of a net to a specific CM 218 or MCU 602. The choice of CM might instead be determined dynamically, based on proximity to the majority of net participants (determined using available position location techniques), available quality of service on a service provider's inter-system network, and other factors. Similarly, any CM's SIP redirect server should be capable of redirecting any CD to the appropriate MCU's SIP user-agent server, and/or, if necessary, forwarding CDs to another SIP redirect server.

In an integrated system, a net's net-address has meaning throughout the group communication system. As a result, one or more top-level SIP servers are responsible for redirecting INVITE requests and distributing net participants to MCUs. These top-level SIP servers should share a common user and net database, providing identical functionality and redirection decisions at different network rendezvous points. As a result, the redirection of CD originated invitations provides an important and critical layer of abstraction that allows multiple CM installations to be integrated into a single homogeneous group communication service.

Figure 11:
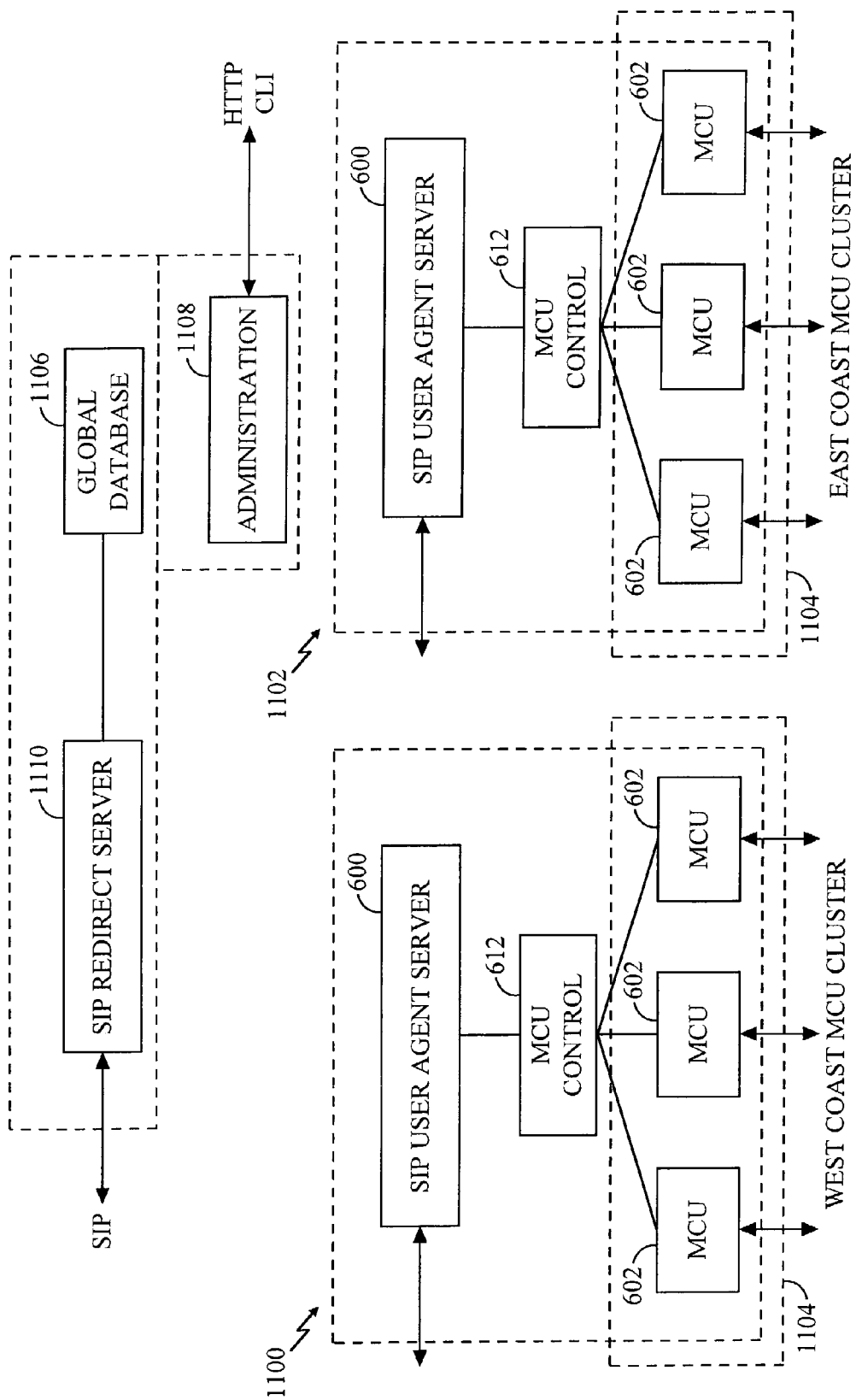
FIG. 11 is a functional block diagram of an integration of a first communications manager and a second communications manager.

An integrated group communication system is shown in FIG. 11. In this example, CM 1100 supports a terrestrial cellular communication network and CM 1102 supports a satellite communication network. In an integrated group communication service, the system scales by duplicating the functionality provided by MCU Controller 612, its associated set of MCUs 602, known as an MCU cluster 1104, and associated SIP User-Agent Server 600. A single database 1106 and administration interface 1108 is shared by the multiple CMs in the system. Communication between functional entities is not shown.

The process by which a CD joins a net in such an integrated system is similar to that used in a system comprising a single CM installation. CD 202 initially sends SIP requests to the top-level (now global) SIP redirect server 1110. SIP redirect server 1110 redirects, via signaling mechanisms such as SIP, the requesting CD to the appropriate destination. In the case of an INVITE request to join a net, the destination is the SIP user-agent server 600 associated with the MCU with current responsibility for the net in question. In the case of an INVITE requesting a current list of nets available to CD 202, the destination may generally be any user-agent capable of responding to the request.

Separately, the redirect server 1110 may exchange additional messages with MCU Cluster 1104 via inter-application messaging using known implementation-specific protocols and/or messaging conventions.

As in the non-integrated case, special startup action is necessary to ensure that redirect server 1110 can determine a destination for the INVITE requests it receives. One possible implementation would require SIP registrations to exist at redirect server 1110. It is also possible to require that redirect server 1110 query global database 1106 and attempt to map each invitation request to a net definition contained therein.

Commercial Security

In one embodiment, encrypted group communications are possible as an optional feature. At the option of net users, voice and data transmitted on a particular net may be encrypted at the transmitting CD, and decrypted by all other CDs in the net. Encryption is end-to-end—i.e. from a first CD to a second CD. Communications from CDs are generally encrypted by a commercial encryption algorithm which is incorporated in the CD. In one embodiment, the choice of whether a CD treats a net as encrypted or unencrypted is at the discretion of the net users—usually, no involvement from CM 218 is required.

Users may select whether they would prefer communications to be encrypted on a net-by-net basis. In one embodiment, a user is given the capability to enter an encryption key for a net using the user-interface. The user will thus be capable of engaging in encrypted communications with other users of the net who have also selected the encryption option for that net and who are also using the same encryption key.

Generally, the user may enable or disable the encryption of net traffic at any time.

In one embodiment, media traffic is symmetrically encrypted through the use of a symmetric key, otherwise known as a traffic encryption key, or TEK, that is shared by other net users. Generally, there is no key agreement algorithm, for example, the well-known Diffie-Hellman algorithm, for net users. Net traffic encryption keys are generated off-line by a net user or net administrator and then securely distributed to the net participants who manually enter the keys into their respective phones. This key is used for all media traffic over a particular net, until new keys are generated and distributed to the net users to replace the previous net TEK.

Encryption Selection

As explained above, CD 202 is notified when it becomes a member of a particular net via messages received from CM 218. The net administrator for a specific net may set an advisory flag that indicates that net traffic should be encrypted. This indication is advisory only and does not authoritatively indicate that communications on the net are actually encrypted.

The CD 202 user interface will allow a user to designate any net as an encrypted net, and allow the user to input the net TEK, independently of whether an encrypted advisory flag for the net has been received by CM 218.

CDs may enforce minimum and maximum key lengths. CDs may provide a means for a key checksum to be input along with the key, and if provided, to check the checksum against the key entered. If the checksum is not entered, the phone calculates the checksum and makes it available for display to the user. CDs generally will not display the key on the phone display after initial key entry.

Once a key has been successfully entered for a given net, media transmissions on this net will be encrypted using this key, and traffic received on this net will be decrypted using the key. The encrypted traffic will include additional headers that allow the phone to synchronize the encryption/decryption process, to allow for late synchronization (synchronization to a transmission already in progress), and to confirm that the sender and receiver are using identical traffic encryption keys. If CD receives encrypted traffic (detected by the presence of the encryption headers) on a net which it has not designated as encrypted, CD will indicate that it is receiving encrypted traffic to the user, and will not output traffic, for example, mute the audio, or suppress data output. Similarly, if CD receives media traffic which is not encrypted on a net for which it is configured to encrypt, or if the traffic is not decrypted correctly (for instance if the keys are incompatible), the phone should alert the user and mute the traffic.

Key Generation and Distribution

The key for an encrypted net is generally a random, binary number. In general, this key will be generated by one party in a net, or an administrator for that net, and distributed securely to the net participants. Since the key distribution policy is currently left to the net users and is external to CM 218, it is a potential source of compromise of the net security. A preferred method of key distribution is via secure means, such as via PGP encrypted e-mail to the net participants. Other methods are also possible—by telephone call or face to face meeting, or by automatic distribution, making use of a PGP secret key which is generally imbedded in each CD for SIP authentication.

The entity responsible for generating a key for a secure net should select a random binary number of sufficient length to guarantee the level of security needed. This key may then be converted to a decimal number, containing digits in the range 0-9, for entry into CD 202 by the user. CD 202 then converts the decimal number to a binary number, and uses the binary number as the encryption key. To enter the equivalent of a 112-bit key, for example, the user would need to enter a 34 digit decimal number. CD generally is capable of detecting a "bad" key, such as a key comprising all zeroes, all ones, or alternating ones and zeroes.

In one embodiment, encrypted nets will use "counter-mode" encryption. This involves electronic codebook (ECB) encryption of a counter known as the State Variable, or State Vector (SV), and exclusive OR'ing the output with a block of plain-text bits. The counter value is incremented and the process is repeated for each block of plain-text. The encryption algorithm used in one embodiment is Triple-DES with two keys ($E_1D_2E_1$ mode), used in the counter mode. The codebook width is 64 bits. Other encryption algorithms are also possible.

In one embodiment, the encryption key length is fixed at 112 bits. If a user enters insufficient decimal digits to produce a 112 bit binary key, a fixed pattern is appended to the user's input to produce a 112 bit binary number. In one embodiment, the least-significant 56 bits will be used as the first DES ($E_1$) encryption key. The most-significant 56 bits will be used as the second DES ($D_2$) key. Of course, other variations are possible.

The State Vector (SV) organization is shown in FIG. 12. In one embodiment, the state vector consists of the following fields:

16 Bit Sender ID field 1200:
This field is used to help ensure uniqueness of the crypto SV among users.
For group communication service, the Sender ID should be a unique number for all users of a particular TEK (e.g. unique for an encrypted net). The sender ID will be chosen randomly by CD 202 when a key is entered into the phone for a particular net.
Alternatively, users may have the option of entering a known unique random value. The sender ID is generally net specific, and does not change as long as the TEK is used.

4 Bit Application ID field 1202:
This field is used to identify a crypto-stream used for different and possibly simultaneous applications such as voice, data, or in-call signaling.

44 Bit State Counter field 1204:
This field is subdivided into the following subfields:
2 Bit Implicit Component 1206:
This field is normally never sent (hence it is "implicit"), but is used to maintain SV uniqueness whenever multiple codebooks are needed to encrypt (or decrypt) a data frame. This counter can be thought of as a data frame codebook counter, reset to zero on each new data frame, counting the codebooks used per data frame.
14 Bit Short Term Component 1208:
This field is sent periodically (within an RTP payload) and serves as a data frame counter.
For group communication service, the entire field is sent once for each transmitted packet (which may include one or more data frames). This field can be thought of as a data frame counter, since it increments by one for each data frame, regardless of the number codebooks needed per data frame.
28 Bit Long Term Component 1210:
This field constitutes the "high order" bits of a 42 bit counter formed by the Long Term and Short Term components.
During a transmission, this field automatically increments by one whenever the short term component "rolls over." The initial value of the long-term component is chosen randomly when a new key is entered. The long-term component is incremented every time the short term component rolls over. The long term component rolls over to all zeros if it reaches the all ones state.

Initialization and SV Uniqueness

There is no requirement for initialization of the lower 44 bits of the State Vector (other than the two bit implicit field, which is reset to zero for each data frame). The transmitter, however, is required to ensure uniqueness of the State Vector (SV) over the life of the traffic key. The life of a traffic key may be an arbitrary (but finite) time. Sender ID field 1200 helps ensure that SVs are unique among a group of net users. The Implicit bits are initialized to '00' and are used in sequential order as a codebook counter within a data frame. This capability is applicable for data frames that are longer than a single codebook.

Since there is no central authority to assign Sender IDs, uniqueness of Sender IDs among net users cannot be guaranteed absolutely. The Sender ID is generally set randomly when a new key is entered. It remains constant for the duration of the use of that key. In the unlikely event that more than one participant in a net is using the same Sender ID, SV uniqueness may still exist if the long-term and short-term components between the users are unique.

Application ID 1202 is used to distinguish between cryptostreams generated from different applications.

State Vector Maintenance—Transmitter

For every data frame delivered to the encryption device, the transmitter ensures the uniqueness of the state vector during the lifetime of the traffic key. This is accomplished by incrementing the existing short term component following use of the state vector in an encryption operation (i.e. after the encryption of a single data frame). The Implicit Component is set to zero initially, and incremented for each successive codebook generated to encrypt a data frame. If the Short Term Component reaches its maximum value during the call, the transmitter sets the Short Term Component to zero, and increments the Long Term Component.

Receiver

For data frames delivered to the decryption device in a receiver, an associated state counter will be determined prior to decryption. The Short Term and Implicit Components are extracted from the RTP payload if used and provided to the decryption device along with the data to be decrypted. If the Short Term Component reaches its maximum value during the call, the decryption device increments the Long Term Component to maintain synchronization. The decryptor will also track the periodic reception of parts of the state vector embedded in the stream to facilitate late entry. If for some reason there is a mismatch, the decryptor will use the periodically recovered value to update the pertinent parts of the State Vector for decryption.

Maintaining Cryptosync

Synchronization must be maintained between the transmitter and the receiver. Generally, each data frame's encryption begins with a new codebook. That is, there is no attempt to save codebook bits from one frame to the next. If more codebook bits are generated than needed for encryption, remaining bits are discarded after encrypting the data frame. The receiver must follow the identical procedure to remain in synchronization.

State Vector synchronization is maintained by periodically transmitting portions of the SV as dictated by the application. Cryptosync information is sent within an RTP payload using an appropriate RTP payload profile. The cryptosync portion of the initial RTP payload consists of the Short Term Component (14 bits), Sender ID (16 bits), Application ID (4 bits), and Long Term Component (28 bits), as shown in FIG. 13.

Successive RTP Payloads update the Short Term Component and Application ID on a per payload basis, while the remaining fields (including the Long Term Component) are sent six bits at a time, on a cyclic basis, to facilitate "late entry," as required for group communications. Since there are 44 bits to be sent periodically (28 Long Term+16 Sender ID), it will take 44/6 or eight packets to accumulate these components from the periodic transmissions. In addition, a predefined signal, such as two transmissions of all ones (111111) should be included between each cycle of the periodic transmissions (eight packets of periodic transmission+two flag) as a start of frame flag. The value of the Long Term Component transmitted in a sequence of eight frames is the value that was valid at the first flag frame at the beginning of the transmission (this covers the case when the Long Term Component is in the process of rolling over).

If RTP is not used (for example, if CRTP Header Compression is unavailable), information identical to that described above should be inserted in the "application header" of a UDP packet stream. For simplicity, the procedures used for transmitting and maintaining cryptosync should be similar to those used when RTP is present.

Key Checksum

In one embodiment, CD 202 will calculate a checksum on entered traffic encryption keys. Checksums can be used to verify that the correct key has been entered, or can be exchanged (verbally or via e-mail, for instance) between users to verify that users are using the same TEK for a particular net. Knowledge of the checksum should not allow the user to determine the value of the key.

CD 202 will compute the checksum for any entered key, and this is generally available for display to the user. The checksum may be entered with the key, as an option. If the user inputs a checksum, CD 202 should not accept the key unless the entered checksum agrees with the CD-calculated checksum.

Sync Check

Figure 14:
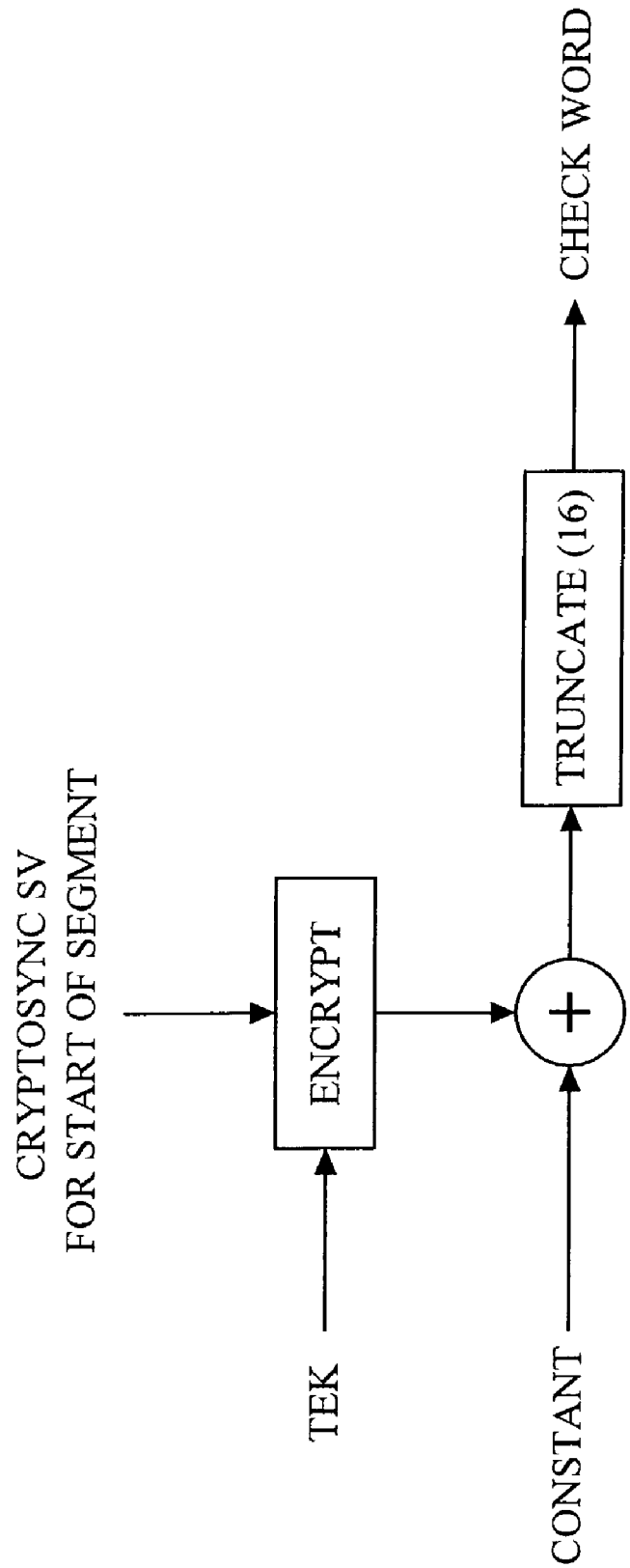
FIG. 14 is a functional block diagram illustrating the generation of a sync-check word.

A transmitting CD generally will include a sync-check word periodically in an encrypted transmission. In one embodiment, the sync-check word is the result of encrypting a known constant value, using the current TEK of the net, and the current crypto-sync state variable of the net, then truncating the result to a portion, such as the 16 least significant bits, as shown in FIG. 14. The 16-bit sync-check word is transmitted in the 16 bit sync-check header field of the RTP payload.

The sync-check field is included periodically in the transmitted stream to allow late entry/synchronization to a transmission already in progress (i.e. a receiver has missed the transmission of the entire state variable at the start of transmission). The sync-check field is transmitted periodically, in one embodiment, at least once per second.

The encryption of the sync-check word uses one value of the short-term component of the cryptosync state variable, just as the encryption of a standard data frame. If a sync-check word is included in a transmitted RTP frame, the first state variable value is used to encrypt/decrypt the sync-check word, and the encryption/decryption of the payload starts with the subsequent value.

The constant value used in the sync check word generation process is entered along with the net TEK. In one embodiment, the constant is 64 bits long, equal in length to one codebook. The constant value may be appended to the key and entered as one long decimal string. A delimiter may be used to separate the key and sync-check constant. The checksum will be calculated over the key and sync check constant.

The previous description of the preferred embodiments is provided to enable any person skilled in the art to make or use the system and method for providing group communication services. The various modifications to these embodiments will be readily apparent to those skilled in the art, and the generic principles defined herein may be applied to other embodiments without the use of the inventive faculty. Thus, the system and method for providing group communication services is not intended to be limited to the embodiments shown herein but is to be accorded the widest scope consistent with the principles and novel features disclosed herein.

We claim:

1. A system for providing a group communication service to a plurality of communication devices in a wireless environment, comprising:

a first communication device configured to convert information signals into data packets configured for transmission over a packet data network, operable to provide said data packets to said packet data network, and operable to receive data packets from said packet data network;

a second communication device configured to convert information signals into data packets configured for transmission over said packet data network, operable to provide said data packets to said packet data network, and operable to receive data packets from said packet data network;

a third communication device configured to convert information signals into data packets configured for transmission over said packet data network, operable to provide said data packets to said packet data network, and operable to receive data packets from said packet data network; and a communications manager connected to said packet data network configured to provide arbitrated group communications among at least said first communication device, said second communication device, and said third communication device, wherein the group communication operates over the Internet protocol (IP) level and is further configured to grant a transmission privilege to either said first communication device, to said second communication device, or to said third communication device, said transmission privilege for allowing only one of said communication devices to transmit said data packets in association with the arbitrated group communication at any given time.

2. The system of claim 1 wherein said arbitrated group communications is further configured to route said data packets from said first communication device to said second and third communication devices, to route said data packets from said second communication device to said first and third communication devices, and to route said data packets from said third communication device to said first and second communication devices.

3. The system of claim 1 wherein said first communication device comprises a wireless communication device.

4. The system of claim 1 wherein said first communication device is selected from the group comprising a wireless telephone, a wireless camera, a wireless video camera, a wireless computer, a pager, a wireless audio recording device, a desktop computer, a wireline telephone, and a digital camera.

5. The system of claim 1 wherein said first communication device further comprises:
a processor configured to request the transmission privilege from said communications manager.

6. The system of claim 1 wherein said information signals are selected from the group comprising audio signals, visual signals, and data.

7. The system of claim 1 wherein said communications manager further comprises:
a multipoint control unit (MCU) configured to receive a data packet from said first communication device and to generate a duplicate data packet to be sent to said second communication device and to generate a duplicate data packet to be sent to said third communication device.

8. The system of claim 1 wherein said communications manager further comprises:
a local database configured to store information relating to said first communication device, said second wireless communication device, and said third communication device.

9. The system of claim 1, wherein said communications manager comprises:
a multipoint control unit (MCU) configured to receive said data packets from said first communication device and to create at least two duplicate data packets for each of said data packets received from said first communication device, a first of said duplicate data packets comprising addressing information corresponding to said second communication device and a second of said duplicate data packets comprising addressing information corresponding to said third communication device.

10. The system of claim 1, wherein said first communication device operates in a terrestrial cellular communication system and said second wireless communication device operates within a satellite communication system.

11. The system of claim 1, wherein said first communication device operates in a CDMA communication system and said second communication device operates within a GSM communication system.

12. The system of claim 1, wherein:
said first communication device is identified by a first data address and is a member of a net;
said second communication device is identified by a second data address and is a member of said net; and
said first communication device communicates with said second communication device by sending said data packets to a third data address, said third data address associated with said net, said net hosted by said communications manager, said communications manager configured to receive said data packets from said first communication device, further configured to duplicate said data packets and to address said duplicate data packets to said second data address, and to send said duplicate data packets to said second communication device.

13. A method for providing a group communication service to a plurality of communication devices in a wireless environment, comprising:
granting a transmission privilege to only one of the plurality of communication devices for allowing the only one of the plurality of communication devices to transmit data packets over a packet data network in association with an arbitrated group communication at any given time; and
providing arbitrated group communications among three or more of the plurality of communication devices by receiving data packets configured for transmission over a packet data network from the communication device that has been granted the transmission privilege and sending the received data packets to at least two other of the plurality of communication devices, wherein the group communication operates over the Internet protocol (IP) level.

14. A non-transitory computer-readable storage medium storing at least one instruction, which, when executed by a machine, causes the machine to perform operations in a wireless environment, the instructions comprising:
a set of instructions to grant a transmission privilege to only one of a plurality of communication devices for allowing the only one of the plurality of communication devices to transmit data packets in association with an arbitrated group communication at any given time; and
a set of the instructions to arbitrate group communications among three or more of the plurality of communication devices by receiving data packets configured for transmission over a packet data network from the communication device that has been granted the transmission privilege and sending the received data packets to at least two other of the plurality of communication devices, wherein the group communication operates over the Internet protocol (IP) level.

15. An apparatus for providing a group communication service to a plurality of communication devices, comprising:
means for granting a transmission privilege to only one of the plurality of communication devices for allowing the only one of the plurality of communication devices to transmit data packets in association with an arbitrated group communication at any given time; and
means for providing arbitrated group communications among three or more of the plurality of communication devices by receiving data packets configured for transmission over a packet data network from the communication device that has been granted the transmission privilege and sending the received data packets to at least two other of the plurality of communication devices, wherein the group communication operates over the Internet protocol (IP) level.

16. An apparatus for providing a group communication service to a plurality of communication devices in a wireless environment, comprising:

a memory unit; and a multipoint control unit (MCU) configured to grant a transmission privilege to only one of the plurality of communication devices for allowing the only one of the plurality of communication devices to transmit data packets in association with an arbitrated group communication at any given time, and to provide arbitrated group communications among the plurality of communication devices by receiving data packets configured for transmission over a packet data network from the communication device that has been granted the transmission privilege and sending the received data packets to at least two other of the plurality of communication devices, wherein the group communication operates over the Internet protocol (IP) level.

17. A method for providing a group communication service to at least three communication devices in a wireless environment, comprising:

granting a transmission privilege to only one of the at least three communication devices for allowing the only one of the at least three communication devices to transmit data packets in association with an arbitrated group communication at any given time; and arbitrating group communications which operates over the Internet protocol (IP) level for the at least said three communication devices by receiving data packets configured for transmission over a packet data network from the communication device that has been granted the transmission privilege and sending the received data packets to at least two other of the at least three communication devices.

18. A system for providing a group communication service to a plurality of communication devices in a wireless environment, comprising:

a first communication device configured to convert information signals into data packets configured for transmission over a packet data network, operable to provide said data packets to said packet data network, and operable to receive data packets from said packet data network;

a second communication device configured to convert information signals into data packets configured for transmission over said packet data network, operable to provide said data packets to said packet data network, and operable to receive data packets from said packet data network;

a third communication device configured to convert information signals into data packets configured for transmission over said packet data network, operable to provide said data packets to said packet data network, and operable to receive data packets from said packet data network; and a communications manager connected to said packet data network configured to provide arbitrated group communications among at least said first communication device, said second communication device, and said third communication device, wherein the group communication operates over the Internet protocol (IP) level and further includes a multipoint control unit (MCU) configured to receive a data packet from said first communication device and to generate a duplicate data packet to be sent to said second communication device and to generate a duplicate data packet to be sent to said third communication device.

19. A method of providing arbitrated group communications among three or more of a plurality of communication devices, comprising:

receiving a data packet from a first communication device of the plurality of communication devices at a multipoint control unit (MCU);

generating a duplicate data packet of the received data packet to be sent to a second communication device of the plurality of communication devices;

generating another duplicate data packet of the received data packet to be sent to a third communication device of the plurality of communication devices; and sending the generated duplicate data packets from the MCU to the second and third communication devices, respectively.

20. A communications manager configured to provide arbitrated group communications among three or more of a plurality of communication devices, comprising:

means for receiving a data packet from a first communication device of the plurality of communication devices at a multipoint control unit (MCU);

means for generating a duplicate data packet of the received data packet to be sent to a second communication device of the plurality of communication devices;

means for generating another duplicate data packet of the received data packet to be sent to a third communication device of the plurality of communication devices; and means for sending the generated duplicate data packets from the MCU to the second and third communication devices, respectively.

21. A non-transitory computer-readable storage medium storing at least one instruction, which, when executed by a machine, causes the machine to perform operations in a wireless environment, the instructions comprising:

a set of instructions to receive a data packet from a first communication device of the plurality of communication devices at a multipoint control unit (MCU);

a set of instructions to generate a duplicate data packet of the received data packet to be sent to a second communication device of the plurality of communication devices;

a set of instructions to generate another duplicate data packet of the received data packet to be sent to a third communication device of the plurality of communication devices; and a set of instructions to send the generated duplicate data packets from the MCU to the second and third communication devices, respectively.

22. A method of participating in a group communication session at a communication device within in a wireless environment, comprising:

sending a request to a communications manager to request a transmission privilege for the communication device, the communications manager responsible for arbitrating the group communication session involving the requesting communication device and at least two other communications devices, and the requested transmission privilege for allowing only the requesting communication device to transmit data packets in association with the arbitrated group communication at any given time;

receiving a message from the communications manager that grants the transmission privilege to the requesting communication device; and sending data packets to the at least two other communications devices via the communications manager in response to the received message.

23. A communication device configured to participate in a group communication session within in a wireless environment, comprising:

means for sending a request to a communications manager to request a transmission privilege for the communication device, the communications manager responsible for arbitrating the group communication session involving the requesting communication device and at least two other communications devices, and the requested transmission privilege for allowing only the requesting communication device to transmit data packets in association with the arbitrated group communication at any given time;

means for receiving a message from the communications manager that grants the transmission privilege to the requesting communication device; and means for sending data packets to the at least two other communications devices via the communications manager in response to the received message.

24. A communication device configured to participate in a group communication session within in a wireless environment, comprising:

a transmitter configured to send a request to a communications manager to request a transmission privilege for the communication device, the communications manager responsible for arbitrating the group communication session involving the requesting communication device and at least two other communications devices, and the requested transmission privilege for allowing only the requesting communication device to transmit data packets in association with the arbitrated group communication at any given time; and a receiver configured to receive a message from the communications manager that grants the transmission privilege to the requesting communication device, wherein the transmitter is further configured to send data packets to the at least two other communications devices via the communications manager in response to the received message.

25. A non-transitory computer-readable storage medium storing at least one instruction, which, when executed by a communication device configured to participate in a group communication session within in a wireless environment, causes the communication device to perform operations in a wireless environment, the instructions comprising:

a set of instructions to send a request to a communications manager to request a transmission privilege for the communication device, the communications manager responsible for arbitrating the group communication session involving the requesting communication device and at least two other communications devices, and the requested transmission privilege for allowing only the requesting communication device to transmit data packets in association with the arbitrated group communication at any given time;

a set of instructions to receive a message from the communications manager that grants the transmission privilege to the requesting communication device; and a set of instructions to send data packets to the at least two other communications devices via the communications manager in response to the received message.

* * * * *